(12) United States Patent
Liu et al.

(10) Patent No.: US 12,117,791 B2
(45) Date of Patent: Oct. 15, 2024

(54) TOOL DETECTOR

(71) Applicant: Laser Application Technology Co., Ltd., Taichung (TW)

(72) Inventors: Chien Hung Liu, Taichung (TW); Jia Rong Tsai, Yuanshan Township (TW); Pei Chen Ko, Nantou (TW)

(73) Assignee: Laser Application Technology Co., Ltd., Taichung (TW)

( * ) Notice: Subject to any disclaimer, the term of this patent is extended or adjusted under 35 U.S.C. 154(b) by 387 days.

(21) Appl. No.: 17/533,275

(22) Filed: Nov. 23, 2021

(65) Prior Publication Data

US 2022/0197239 A1 Jun. 23, 2022

(30) Foreign Application Priority Data

Dec. 22, 2020 (TW) ................................ 109145870

(51) Int. Cl.
G05B 19/18 (2006.01)

(52) U.S. Cl.
CPC .. G05B 19/182 (2013.01); *G05B 2219/34224* (2013.01); *G05B 2219/39468* (2013.01)

(58) Field of Classification Search
None
See application file for complete search history.

(56) References Cited

U.S. PATENT DOCUMENTS

| 6,496,273 | B1 | 12/2002 | Stimpson et al. |
| 6,633,379 | B2 | 10/2003 | Roesner et al. |
| 6,635,894 | B1 | 10/2003 | Stimpson et al. |
| 6,878,953 | B2 | 4/2005 | Stimpson et al. |
| 7,053,392 | B2 * | 5/2006 | Stimpson ........... B23Q 17/2485 250/214 DC |
| 7,986,416 | B2 | 7/2011 | Chiu |
| 8,119,964 | B2 | 2/2012 | Hufnagel et al. |
| 8,530,823 | B2 | 9/2013 | Egglestone et al. |
| 9,040,899 | B2 | 5/2015 | Egglestone et al. |
| 9,067,283 | B2 | 6/2015 | Sato |
| 9,149,887 | B2 | 10/2015 | Chen |
| 2008/0069434 | A1 | 3/2008 | Ashton et al. |

(Continued)

FOREIGN PATENT DOCUMENTS

| CN | 1202403 C | 5/2005 |
| CN | 101751001 A | 6/2010 |

(Continued)

*Primary Examiner* — David Earl Ogg
(74) *Attorney, Agent, or Firm* — Best & Flanagan LLP

(57) ABSTRACT

A tool detector including a right-angle triangular base and an automatic controller is revealed. A light source of the right-angle triangular base emits a main light ray to a plane mirror to generate a reflected light ray which is incident to a quadrant detector to create a light receiving area. The automatic controller is for measuring a tool length and a tool radius. A control device of a computer numerical control machine tool sets up a standard value by a standard bar and drives an unfinished tool and a processed tool to set up an original value set and a measured value set. The automatic controller performs an error analysis on the original and measured value sets to get a relative difference of a tool length and radius of the processed tool for measuring the tool length and radius and compensation of thermal variables of the CNC machine tool.

4 Claims, 20 Drawing Sheets

(56) References Cited

U.S. PATENT DOCUMENTS

| | | | |
|---|---|---|---|
| 2009/0051933 A1 | 2/2009 | Stimpson et al. | |
| 2014/0379117 A1* | 12/2014 | Nishimura | G05B 19/404 700/173 |
| 2018/0173188 A1* | 6/2018 | Poletto | B23Q 17/22 |
| 2019/0339356 A1* | 11/2019 | Schildknecht | G01S 17/66 |

FOREIGN PATENT DOCUMENTS

| | | |
|---|---|---|
| CN | 102029554 A | 4/2011 |
| CN | 102672534 A | 9/2012 |
| CN | 104191310 A | 12/2014 |
| CN | 104907889 A | 9/2015 |
| CN | 205799098 U | 12/2016 |
| CN | 109202535 A | 1/2019 |
| CN | 110666590 A | 1/2020 |
| CN | 111001829 A | 4/2020 |
| DE | 102007006306 A1 | 7/2008 |
| EP | 2340914 A1 | 7/2011 |
| JP | S6294209 A * | 4/1987 |
| JP | S6294209 A | 4/1987 |
| JP | H0550362 A | 3/1993 |
| JP | H05162049 A | 6/1993 |
| JP | H05245743 A | 9/1993 |
| JP | 2010162686 A | 7/2010 |
| JP | 2011143468 A | 7/2011 |
| TW | 534976 B | 6/2003 |
| TW | I283616 B | 7/2007 |
| TW | I291395 B | 12/2007 |
| TW | 200810872 A | 3/2008 |
| TW | 201002469 A | 1/2010 |
| TW | 201028242 A | 8/2010 |
| TW | I387507 B | 3/2013 |
| TW | 201416165 A | 5/2014 |
| TW | I473681 B | 2/2015 |
| TW | I476066 B | 3/2015 |
| TW | M515928 U | 1/2016 |
| TW | I548500 B | 9/2016 |
| TW | 201831262 A | 9/2018 |
| WO | WO0138822 A1 | 5/2001 |

* cited by examiner

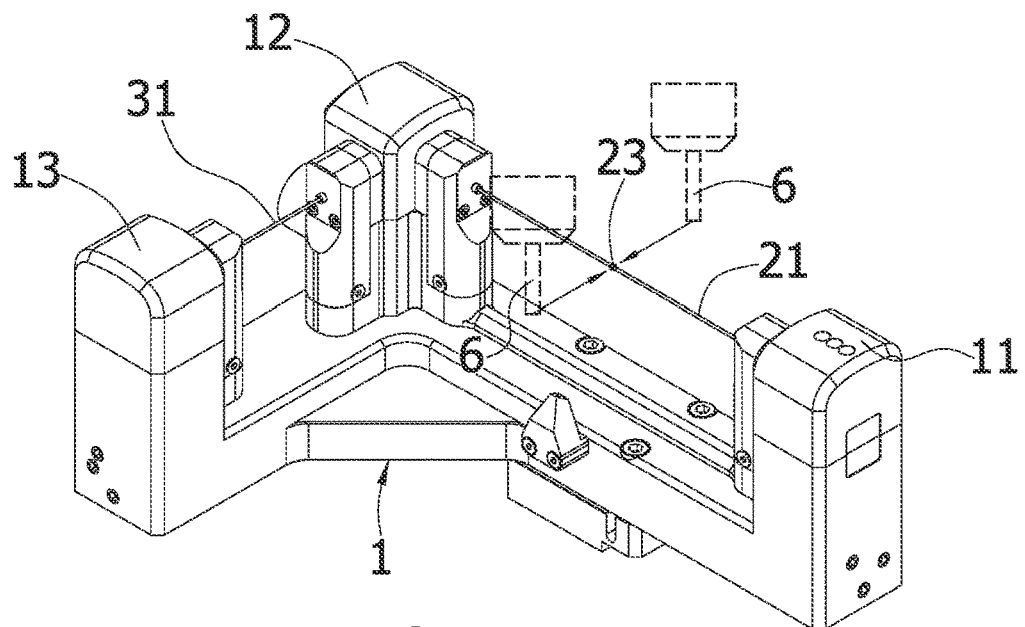
Fig. 11
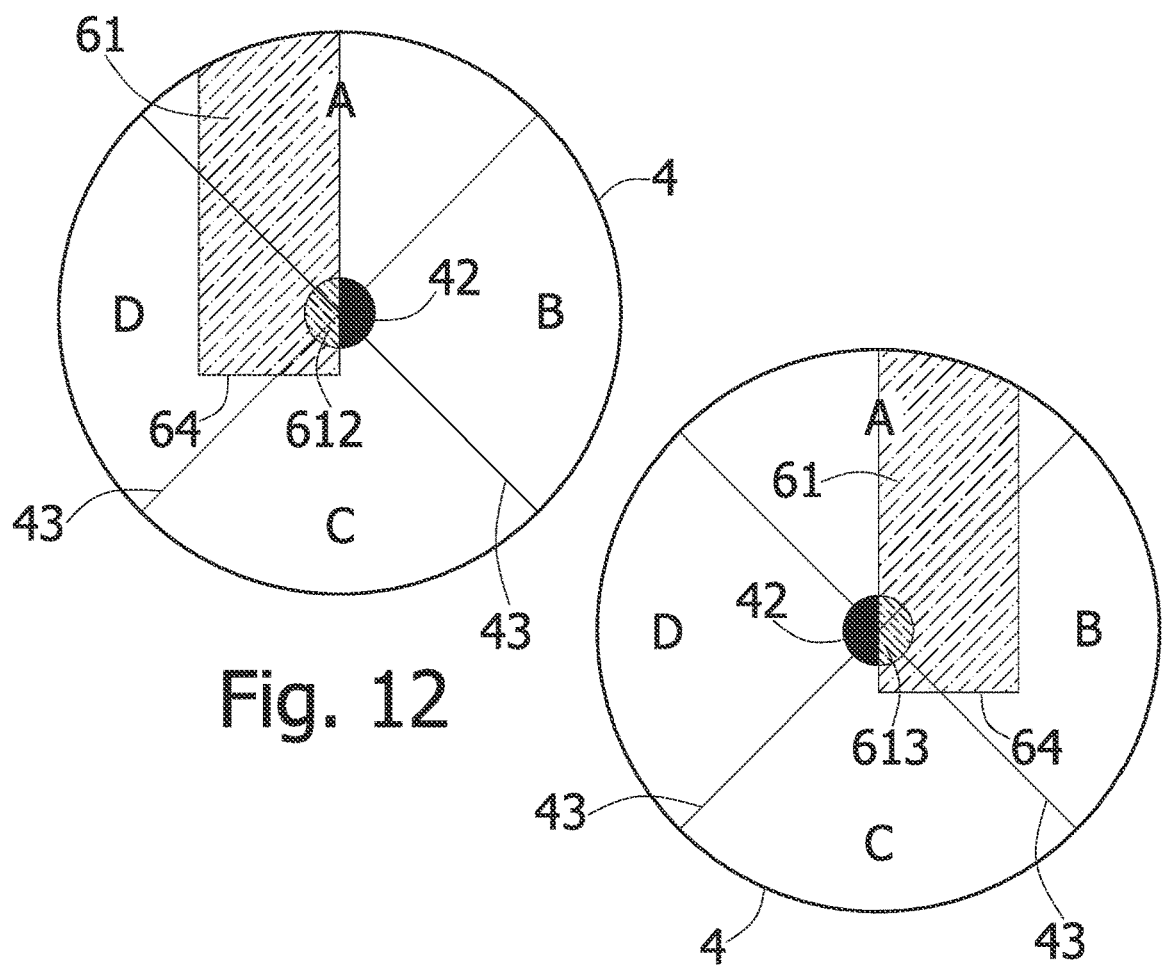
Fig. 12
Fig. 13

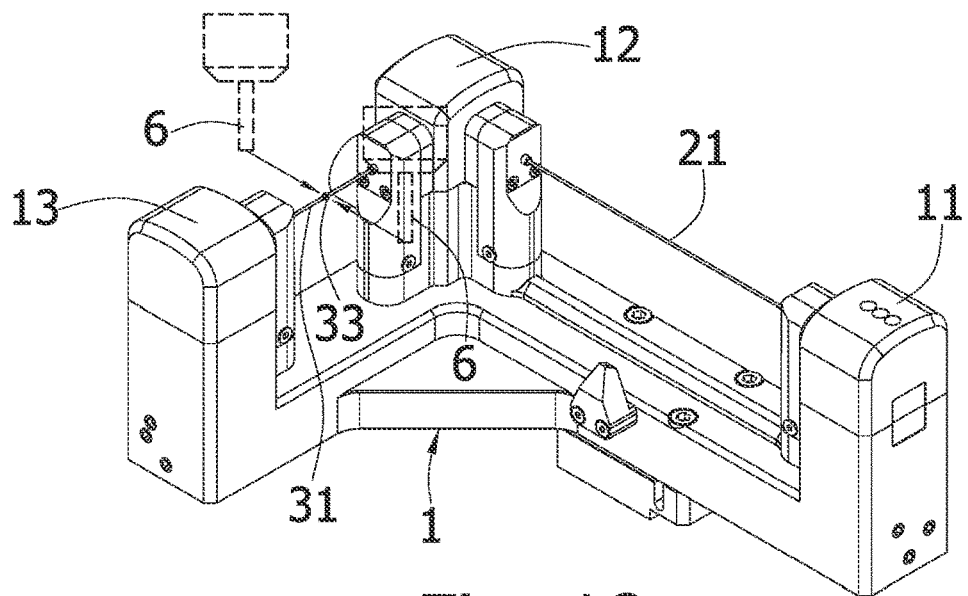
Fig. 18
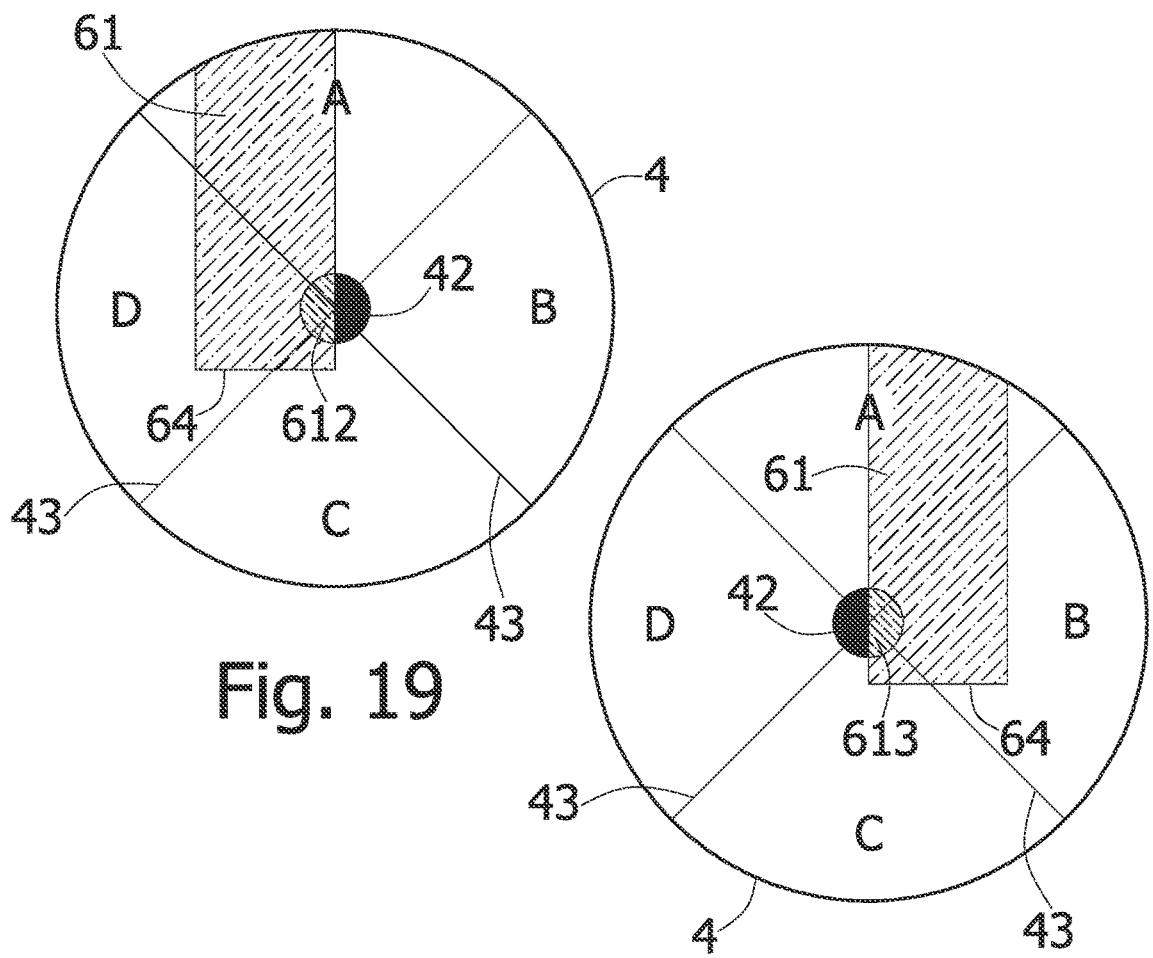
Fig. 19
Fig. 20

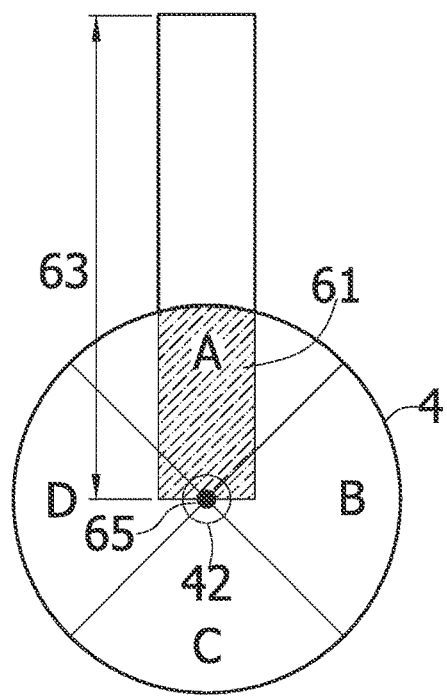
Fig. 27
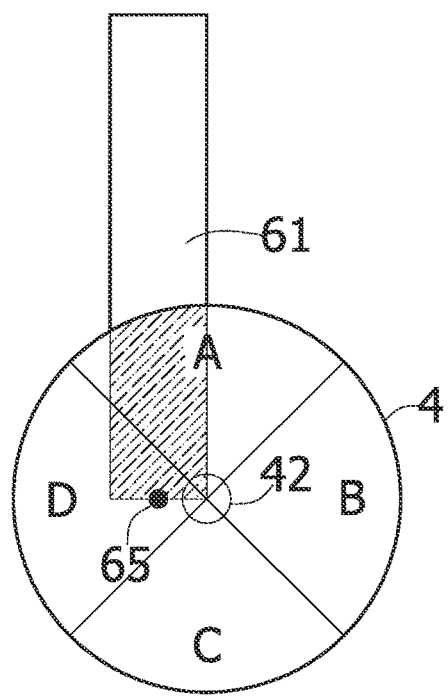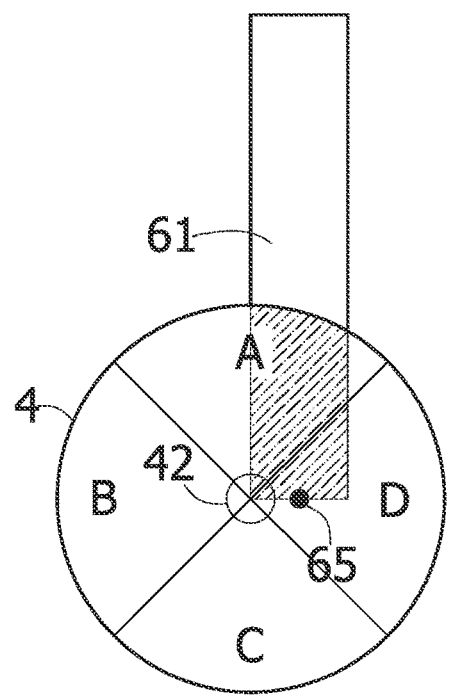
Fig. 28  Fig. 29

TOOL DETECTOR

BACKGROUND OF THE INVENTION

Field of the Invention

The present invention relates to a tool detector, especially to a tool detector which provides a main light ray and a reflected light ray in a measurement space and a complex vector space while the main light and the reflected light ray both have uniformity and stability so that the tool detector is easy to be adjusted and corrected.

Description of Related Art

Refer to Chinese Pat. Pub. No. 1202403C, a method and an optical measuring apparatus for measuring object on machines are revealed. The optical measuring apparatus mainly includes a light source for generating a beam of light and a detector upon which is incident the beam of light. A detection signal is generated within the detector each time the beam is interrupted. A first time interval is provided when the first detection signal is generated. A second time interval is provided wherein the second time interval is shorter than the first time interval and commences at the end of the first time interval. An output signal is emitted from the detector if a further detection signal is present within the detector during the second time interval.

Compared with techniques related to tool detectors revealed in prior arts such as CN101751001A, CN102029554A, CN102672534A, CN104191310A, CN104907889A, CN109202535A, CN110666590A, CN111001829A, CN205799098U, DE102007006306A1, EP2340914A1, EP2340914A1, JP2010162686A, JP2011143488A, JPH0550362A, JPH05162049A, JPH05245743A, JPS6294209A, TW534976B, TW200810872A, TW201002469A, TW201028242A, TW201416165A, TW201531391A, TW201831262, TW1283616, TW1291395, TW1387507, TW1473681, TWI476066, TWI548500, TWM515928, U.S. Pat. No. 6,496,273B1, US2008069434A1, and WO0138822A1 which have certain problems, the present system which is having simple structure and capable of measuring and detecting tool wear and damage while the tool is rotating is more convenient to use.

SUMMARY OF THE INVENTION

Therefore, it is a primary object of the present invention to provide a tool detector which has more functions, repeatability, compact design, higher efficiency, better accuracy and stability, and good scalability compared with conventional tool measuring machines.

It is another object of the present invention to provide a tool detector which needs less maintenance, reduced use of power, and a processing table with smaller area.

In order to achieve the above objects, a tool detector according to the present invention includes a right-angle triangular base and an automatic controller.

The right-angle triangular base is provided with a first angular position, a second angular position, and a third angular position. A main light ray is emitted from a light source disposed on the first angular position to a plane mirror arranged at the second angular position. Thus a reflected light ray is generated due to the plane mirror and incident into a coordinate origin at a center of symmetry of a quadrant detector located at the third angular position to generate a light receiving area. The quadrant detector is disposed by using a diagonal method. That means a coordinate axis of the quadrant detector is rotated with respect to a coordinate origin through an angle of inclination and arranged at the third angular position.

The automatic controller consists of a conserved common variable module and a correcting unit. First a control device drives a standard bar to move and form a shaded area on the quadrant detector. The shaded area is projected in multi-dimensional directions in a measurement space of the main light ray to define a reference coordinate while a position coordinate is defined by projection of the shaded area in multi-dimensional directions in a complex vector space of the reflected light ray. The automatic controller converts orthogonal projection of the reference coordinate and the position coordinate on a hypotenuse of the right-angle triangular base into a spatial coordinate which is a crossing zero. Then the control device drives the standard bar to the reference coordinate and the position coordinate repeatedly at a time interval to get a number of N+1 spatial coordinates which are used for measurement of a thermal variable of a computer numerical control (CNC) machine tool.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 11-13 are schematic drawings showing how a reference point of Y-axis of a main light ray is defined of an embodiment according to the present invention;

FIG. 18-20 are schematic drawings showing how a reference point of X-axis of a reflected light ray is defined of an embodiment according to the present invention;

FIG. 27 is a schematic drawing showing vertical displacement triggering of a standard bar for setting a standard radius vector of an embodiment according to the present invention;

FIG. 28 and FIG. 29 are schematic drawings showing circular motion triggering of a standard bar for setting a standard radius vector of an embodiment according to the present invention;

DETAILED DESCRIPTION OF THE PREFERRED EMBODIMENT

Figure 1:
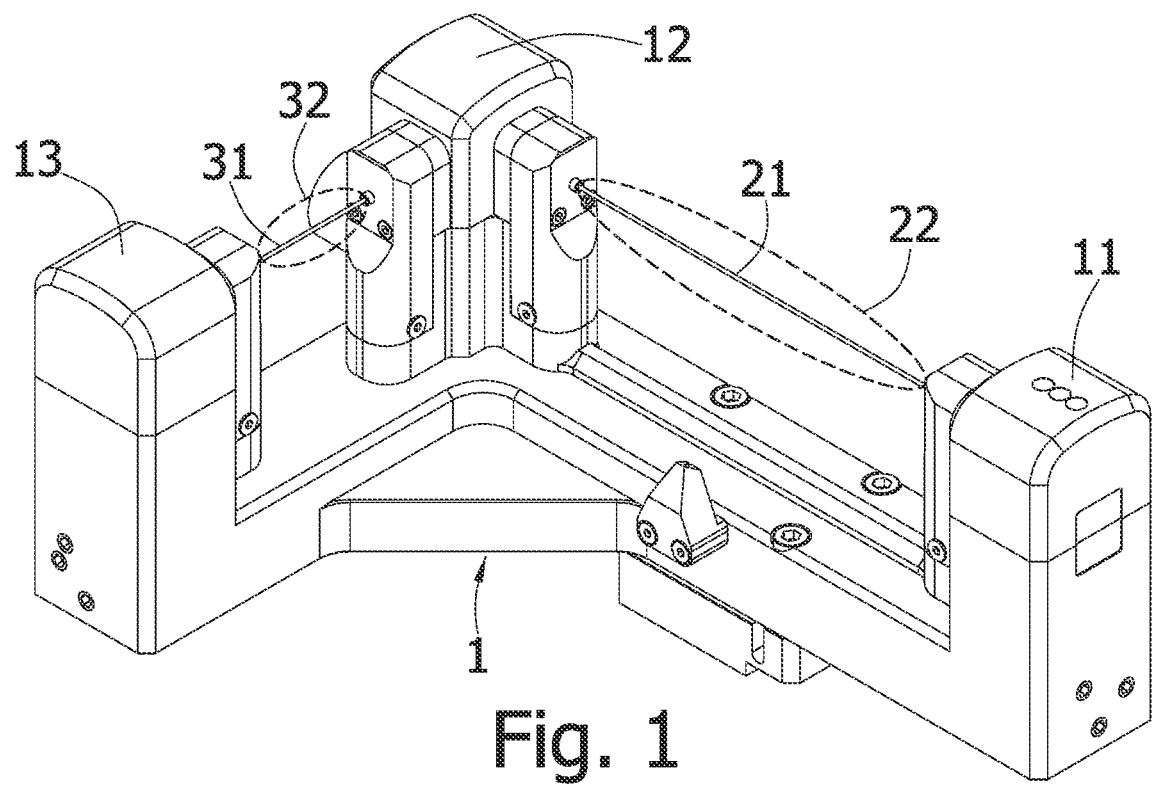
FIG. 1 is a perspective view of an embodiment of a tool detector according to the present invention.
Figure 2:
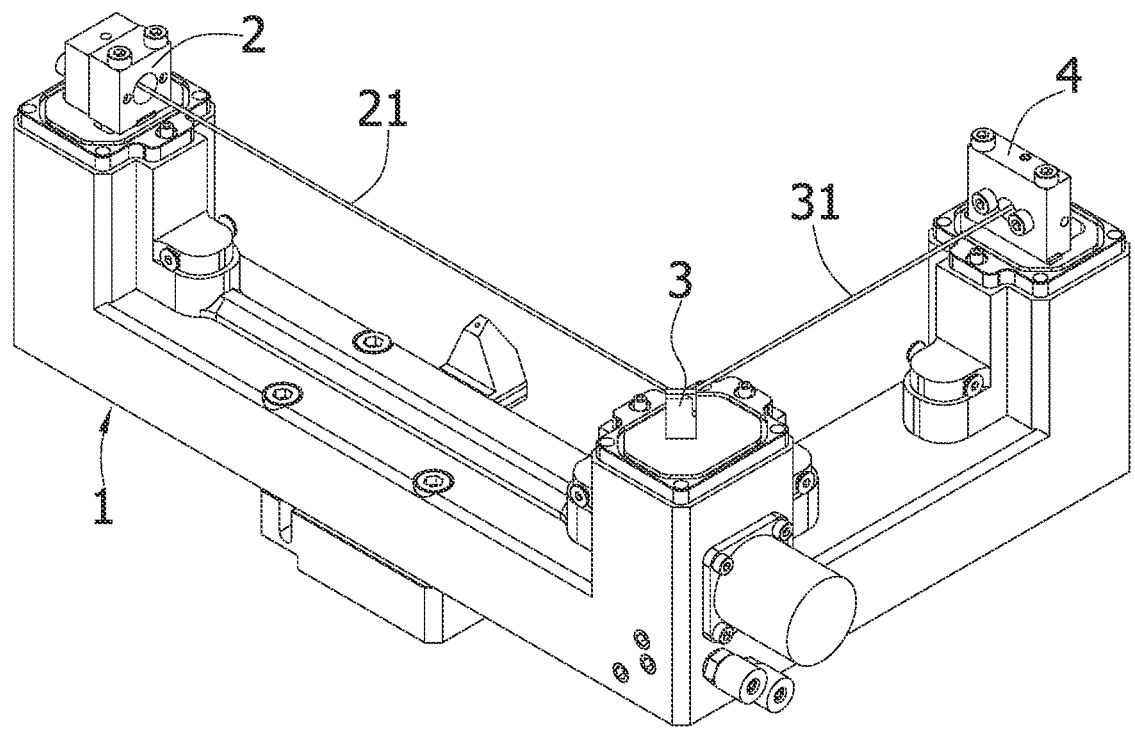
FIG. 2 is a schematic drawing showing light paths from an embodiment of a tool detector according to the present invention.

Refer to FIG. 1-8, at least one tool detector which mainly includes a right-angle triangular base 1 and an automatic controller 5 according to the present invention is disposed on a table of a computer numerical control (CNC) machine tool 8 which is composed of at least one rotating shaft, three linear axes, and a control device 81. The tool detector can be disposed on a diagonal point or a diagonal matrix of the table.

The right-angle triangular base 1 is provided with a first angular position 11, a second angular position 12, and a third angular position 13. A main light ray 21 is emitted from a light source 2 disposed on the first angular position 11 to a plane mirror 3 arranged at the second angular position 12. Then a reflected light ray 31 is generated due to the plane mirror 3 and incident into a coordinate origin 41 at a center of symmetry of a quadrant detector 4 located at the third angular position 13 to have a light receiving area 42. The quadrant detector 4 is disposed by a diagonal method. That means a coordinate axis or an angle bisector 43 of the quadrant detector 4 is rotated counterclockwise (or clockwise) with respect to the coordinate origin 41 through an angle of inclination and disposed on the third angular position 13. The quadrant sensor 4 is composed of one, two or four photoelectric sensor(s) 44 with the same photoelectric properties and surface area. The reflected light ray 31 can also be a broken ray or a refracted ray.

Figure 3A:
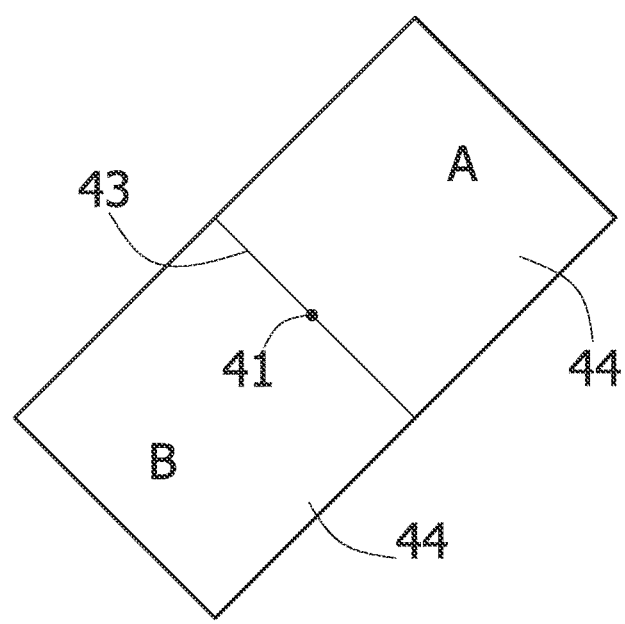
FIG. 3A and FIG. 3B are schematic drawings showing quadrant detectors of an embodiment of a tool detector according to the present invention.
Figure 3B:
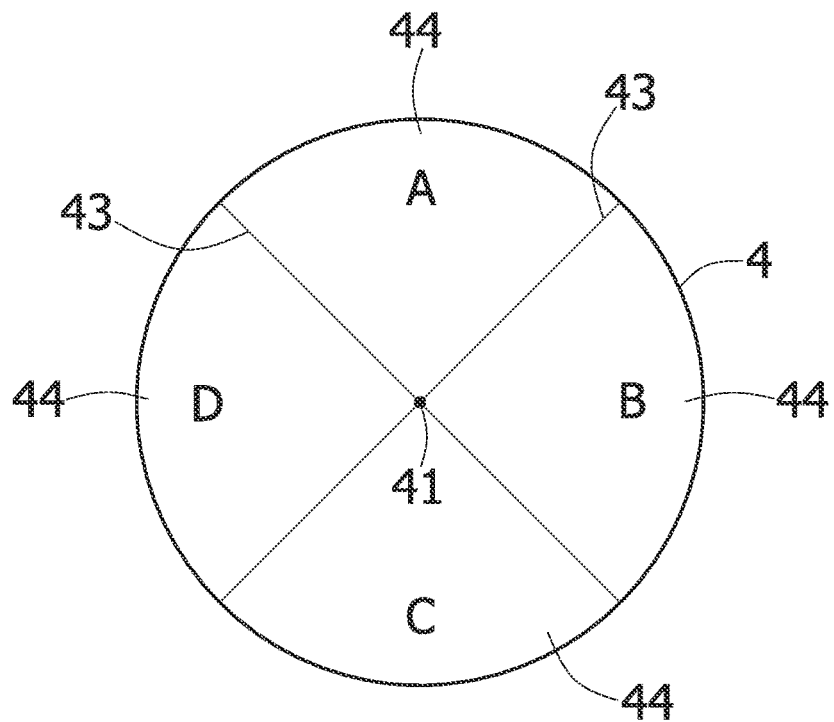
Figure 4:
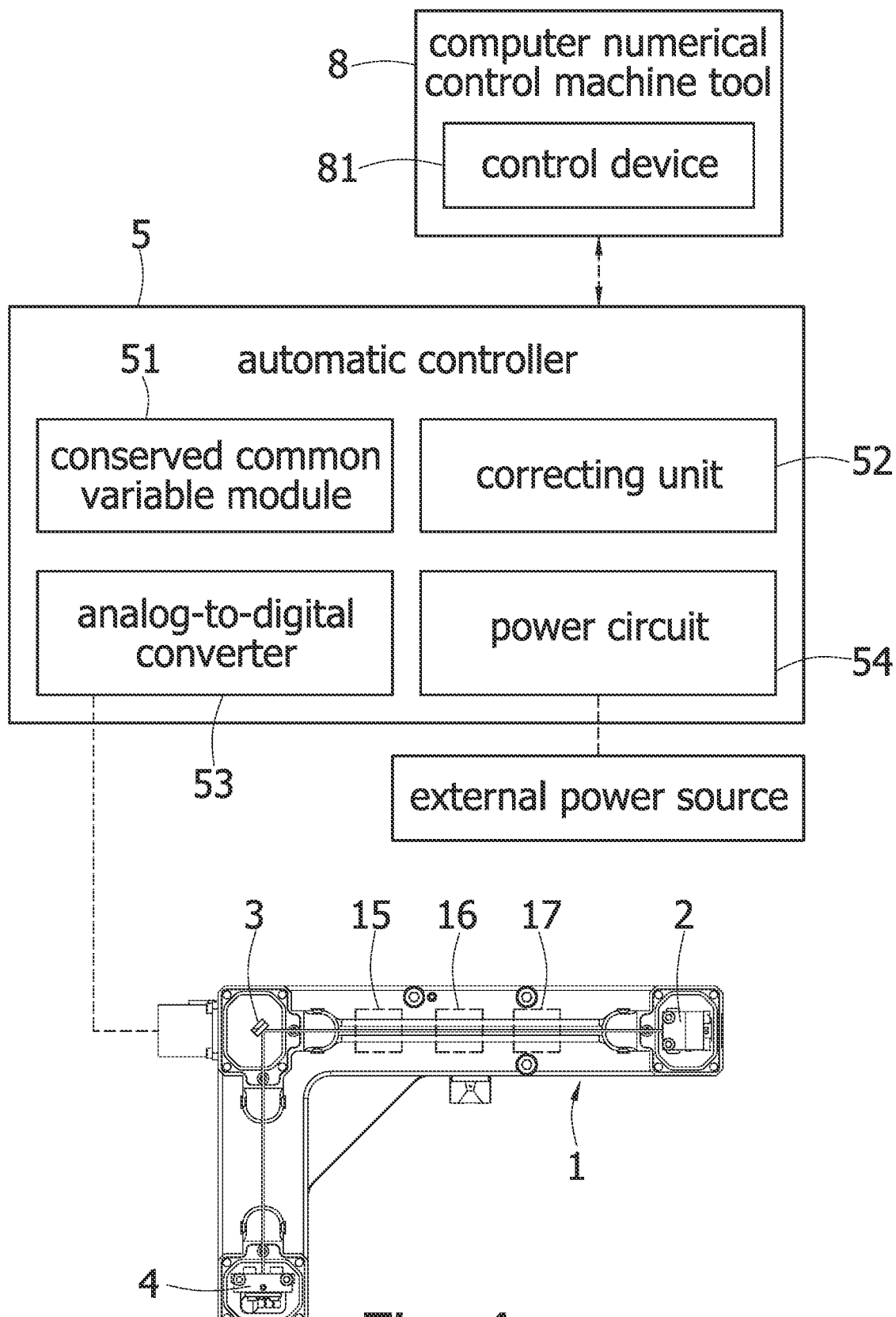
FIG. 4 is a block diagram showing an embodiment of a tool detector in a system according to the present invention.

Refer to FIG. 3 and FIG. 4, the quadrant detector 4 on the right-angle triangular base 1 is a common anode circuit so that the right-angle triangular base 1 is further provided with a current-to-voltage converter 15 for converting current signals of the light receiving area 42 into voltage signals and increasing capacitance of the circuit. The right-angle triangular base 1 further includes a low-pass filter 16 for control of quick change and stabilization of the voltage signals and a reversing amplifier 17 for amplifying the output voltage signals and sending the amplified voltage signals to an analog-to-digital converter 53 of the automatic controller 5. The automatic controller 5 is further provided with a power circuit 54 for power supply so that the automatic controller 5 automatically executes programs fed into the analog-to-digital converter 53 for calculation of measurements desired, The automatic controller 5 consists of a conserved common variable module 51 and a correcting unit 52. First the control device 81 drives a standard bar 6 to move and form a shaded area 61 on the quadrant detector 4. The shaded area 61 is projected onto the main light ray 21 in a measurement space 22 of the main light ray 21 in multi-dimensional directions to define a reference coordinate 23 while a position coordinate 33 is defined by projection of the shaded area 61 onto the reflected light ray 31 in a complex vector space 32 of the reflected light ray 31 in multi-dimensional directions. The automatic controller 5 converts orthogonal projection of the reference coordinate 23 and the position coordinate 33 on a hypotenuse of the right-angle triangular base 1 into a spatial coordinate 14 which is a crossing zero. Then the control device 81 drives the standard bar 6 to the reference coordinate 23 and the position coordinate 33 repeatedly at a time interval to get a number of N+1 spatial coordinates, a number of N+2 spatial coordinates, and a number of N+3 spatial coordinates, all used for measurement of a thermal variable of the CNC machine tool 8.

Next the automatic controller 5 aligns a center point 65 of a reference line 64 of the standard bar 6 with the reference coordinate 23 and/or the position coordinate 33 in the multi-dimensional directions to form the shaded area 61 by projection and set up a standard axial vector 62 and a standard radius vector 63 in the reference coordinate 23 and/or the position coordinate 33 respectively. The standard axial vector 62 and the standard radius vector 63 are input into the automatic controller 5 for creating a calibration curve. The standard axial vector 62, the standard radius vector 63, and the calibration curve are all stored in the conserved common variable module 51 and used as a standard value set for subsequent measurements and comparisons. Later the control device 81 drives an unfinished tool 7 at a working coordinate 75 to align with the reference coordinate 23 and/or the position coordinate 33 for performing measurements.

Figure 8A:
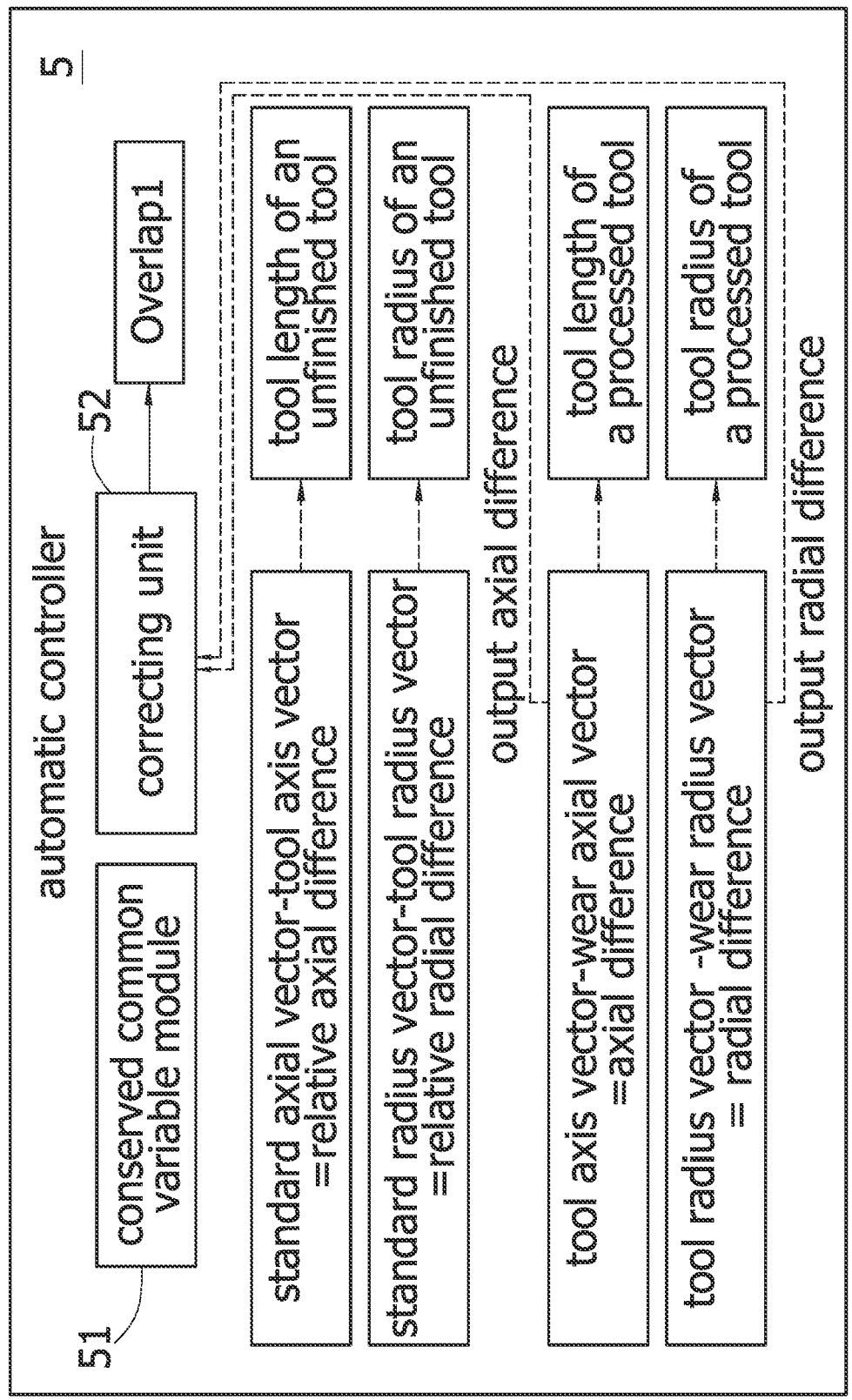
FIG. 8A and FIG. 8B is a process flow chart of an automatic controller of an embodiment according to the present invention.
Figure 8B:
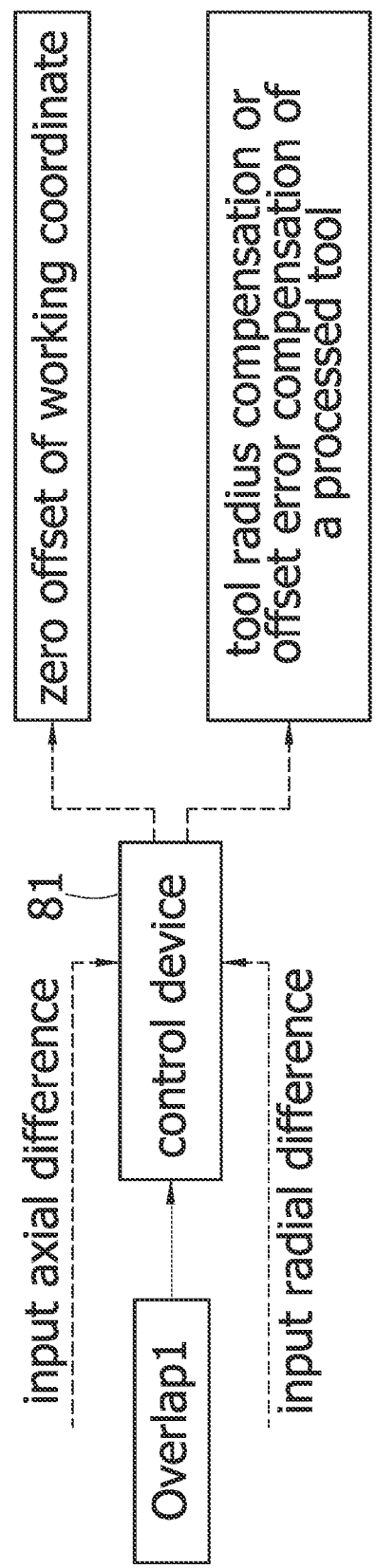

An effective cross sectional area 71 is used to set up a tool axis vector 72, a tool radius vector 73, and an origin coordinate 74 in the reference coordinate 23 and the position coordinate 33 in turn for creating a section curve. The tool axis vector 72, the tool radius vector 73, the origin coordinate 74, and the section curve are all stored in the conserved common variable module 51 and used as an original value set for subsequent measurements and comparisons. Then the automatic controller 5 performs an error analysis on the standard value set and the original value set to get a relative difference which includes a relative axial difference 94 and/or a relative radial difference 95. Thereby a tool length and a tool radius of the unfinished tool 7 are obtained by using the relative difference (as shown in FIG. 8A and FIG. 8B).

Moreover, tool wear or tool failure occurs after the unfinished tool 7 being processed for a period of time and the unfinished tool 7 becomes a processed tool 9. During the processing, the control device 81 drives the processed tool 9 at a working coordinate 75 to align with the reference coordinate 23 and/or the position coordinate 33 and thus an effective area 91 is formed on the quadrant detector 4. After the effective area 91 being input into the automatic controller 5, a wear axis vector 92 and/or a wear radius vector 93 are measured respectively for establishing a wear curve. The wear axis vector 92, the wear radius vector 93, and the wear curve are all stored in the conserved common variable module 51 and used as a measured value set. Then the automatic controller 5 performs an error analysis on the original value set and the measured value set to get an aspect ratio and/or an offset ratio and further obtain a difference of a tool length and/or a tool radius of the processed tool 9. The difference includes an axial difference 94 and/or a radial difference 95. By the correcting unit 52, the axial difference 94 is sent to the control device 81 to reset zero offset of the working coordinate 75 of the processed tool 9 and the radial difference 95 is sent to the control device 81 to reset tool radius compensation or offset error compensation of the processed tool 9 for measurement of the tool length and radius of the processed tool 9 as well as three-dimensional measurement and compensation of thermal variables of the rotating shaft and the three linear axes.

For integrated control of the present tool detector and the CNC machine tool 8, the tool detector is connected to the automatic controller 5 with various measuring programs to have integrated computation with the control device 81 of the CNC machine tool 8. The automatic controller 5 writes specific-purposes programs which make the control device 81 of the CNC machine tool 8 automatically perform tool length and radius measurement of both the unfinished tool 7 and the processed tool 9 as well as measurement and compensation of thermal variables of the rotating shaft and the three linear axes.

Thereby compensation of thermal variables of the rotating shaft and the three linear axes is carried out automatically. In order to allow users easy to use, the automatic controller 5 is connected to a connecting line or a network for remote development and operation. Before the measurement by using the tool detector, users first need to set the reference coordinate 23 and the position coordinate 33 to be measured (as steps shown in FIG. 9-15 and FIG. 16-22 respectively). In the CNC machine tool 8 with three axes or five axes, use the standard bar 6 to look for the reference coordinate 23 and the position coordinate 33 of the tool detector in the measurement space 22 and the complex vector space 32 in multidimensional directions in order to obtain: (a) the standard axial vector 62, the standard radius vector 63, and the standard value set of the standard bar 6. (b) the tool axis vector 72, the tool radius vector 73, the origin coordinate 74, the working coordinate 75, and the original value set of the unfinished tool 7. (c) the wear axis vector 92, the wear radius vector 93, and the measured value set of the processed tool 9.

The light source 2 for two-dimensional parallel transmission which is mounted in the right-angle triangular base 1 emits the main light ray 21 to generate the reflected light ray 31 which is incident into the quadrant detector 4. Such arrangement allows the light source 2 to provide the reflected light ray 31 and the main light ray 21 which can be a smaller collimated light beam or a larger collimated light beam. The spot size of the light source 2 used in combination with the light receiving area 42 of the quadrant detector 4 can be adjusted according to size of the effective cross sectional area 71 of the unfinished tool 7 formed by projection of the main light ray 21 and the reflected light ray 31. Thereby the light source 2 can be used effectively and precise measurement of received light intensity of the light receiving area 42 and the shaded area 61 within light area of the plurality of the photoelectric sensor 44 of the quadrant detector 4 is provided. The automatic controller 5 further includes a laser driver circuit which not only controls spot size adjustment of the light receiving area 42 but also makes the light source 2 have adequate operating wavelength and light intensity control. Thus the main light ray 21 and the reflected light ray 31 provided have good quality, uniformity and stability within the measurement space 22 and the complex vector space 32 and thus the tool detector is easy to be adjusted and corrected.

The laser driver circuit can control the main light ray 21 and the reflected light ray 31 to have a moderately divergent soft focus point which retains the basic Lambertian Gaussian angular power distribution. That means the standard bar 6 is allowed to have a plurality of shaded area 61 such as (a) an upper-side shaded area 614 on a reference point of X-axis (or a reference point of Y-axis). (b) a left-side shaded area 612 as well as a right-side shaded area 613 formed by a horizontal displacement from a left-side position and a right-side position relative to the reference point of X axis (or the reference point of Y axis) to the reference point of X-axis (or the reference point of Y axis) by horizontal displacement. (c) an upper-side shaded area 614 formed by vertical displacement from an upper position relative to the reference point of the X axis (or the reference point of Y axis) to the reference point of the X axis (or the reference point of Y axis), or the effective cross sectional area 71 of the unfinished tool 7 overlapped with the light receiving area 42 of the quadrant detector 4 given by the main light ray 21 and the reflected light ray 31.

The quadrant detector 4 is formed by at least one photoelectric sensor 44 which receives optical signals of the main light ray 21 or the reflected light ray 31 to generate the light receiving area 42 by a center of mass coordinate thereof.

Moreover, the quadrant detector 4 is arranged by a diagonal method in which a coordinate axis of the quadrant detector 4 is rotated counterclockwise 4 with respect to the coordinate origin 41 through an angle of inclination which is ranging from 5-45 degrees, preferably larger than 10 degrees, more preferably 15 degrees, even more preferably 30 degrees, and most preferably 45 degrees to keep the reflected light ray 31 vertically emitted to the quadrant detector 4. Then the quadrant detector 4 with at least one angle bisector 43 receives optical signals of the reflected light ray 31 to generate the light receiving area 42 on the coordinate origin 41. As shown in FIG. 3A and FIG. 3B, the quadrant detector 4 is formed by two and four pieces of photoelectric sensors 44 with the same photoelectric properties and surface area respectively. At least one angle bisector 43 is formed between the two adjacent photoelectric sensors 44 and the respective angle bisectors 43 are inclined an angle with respect to a horizontal plane. Take the embodiment with four pieces of photoelectric sensors 44 each of which has the same surface area as an example. A, B, C, D represent the four photoelectric sensors 44 at four quadrants (four areas) respectively and work together to receive optical signals of the main light ray 21 or the reflected light ray 31 to generate the light receiving area 42. The first quadrant, the second quadrant, the third quadrant, and the fourth quadrant have the same area, one fourth of the light receiving area 42, and in combination with one another to form the light receiving area 42.

At the moment, photocurrent signals output from the four photoelectric sensors 44 at four quadrants A, B, C, D all have the same peak values and an offset of the light receiving area 42 is zero once a center of the light receiving area 42 falls on the coordinate origin 41 which is the center of symmetry of the quadrant detector 4. If there is a displacement between the center of the light receiving area 42 and the coordinate origin 41, the four photoelectric sensors 44 at four quadrants A, B, C, D output the photocurrent signals with different peak values due to different amount of light radiation. The signals output from the four photoelectric sensors 44 at four quadrants A, B, C, D need to be amplified by the reversing amplifier 17 due to small amplitude of the photocurrent.

Refer to FIG. 3A, in the first embodiment of the present invention, the light receiving area 42 of the photoelectric sensor 44 at A and B quadrants (or areas) is used in combination with the shaded area 61 of the standard bar 6 formed on the quadrant detectors 4 to define the reference coordinate 23 and the position coordinate 33 of the tool detector in the measurement space 22 and the complex vector space 32 and further obtain reference points of X-axis, Y-axis, and Z-axis of the reference coordinate 23 and the position coordinate 33 as reference points for measurement. Moreover, measure the effective cross sectional area 71 of the unfinished tool 7 formed on the light receiving area 42 of the photoelectric sensor 44 at the A and B quadrants in the measurement space 22 and the complex vector space 32 while the light receiving area 42 is reduced. Then the automatic controller 5 performs an error analysis on the standard value set and the original value set or uses a correction curve or numerical calculation to calculate the reduction of the light receiving area 42 of the respective photoelectric sensors 44 at the A and B quadrants caused by the effective cross sectional area 71. Thereby a relative difference of voltage changes of the respective photoelectric sensors 44 at the A and B quadrants is obtained.

Refer to FIG. 3B, in the second embodiment of the present invention, the light receiving area 42 of the photoelectric sensor 44 at three of the four quadrants (or areas), A, B, and D, is used in combination with the shaded area 61 of the standard bar 6 formed on the quadrant detectors 4 to define the reference coordinate 23 and the position coordinate 33 of the tool detector in the measurement space 22 and the complex vector space 32 and further obtain reference points of X-axis, Y-axis, and Z-axis of the reference coordinate 23 and the position coordinate 33 as reference points for measurement. Moreover, measure the effective cross sectional area 71 of the unfinished tool 7 formed on the light receiving area 42 of the photoelectric sensor 44 at one of the A, B, and D quadrants or their combinations in the measurement space 22 and the complex vector space 32 when the light receiving area 42 has a reduction of area. Then the automatic controller 5 performs an error analysis on the standard value set and the original value set, or uses a correction curve or numerical calculation to calculate the reduction of the light receiving area 42 of the respective photoelectric sensors 44 at the A, B, and D quadrants caused by the effective cross sectional area 71. Thus a relative difference of voltage changes of the respective photoelectric sensors 44 at the A, B, and D quadrants is obtained.

Instead of the conventional tool detector which has only one side and thus unable to measure axial information parallel to a laser light ray, the present tool detector includes the measurement space 22 and the complex vector space 32 on two sides of the main light ray 21 emitted and the reflected light ray 31 generated respectively. During measurement, as shown in FIG. 1, FIG. 5, and FIG. 9-24, the reference coordinate 23 used as a reference point of the main light ray 21 and the position coordinate 33 as a reference point of the reflected light ray 31 need to be set up respectively as the followings.

Figure 9:
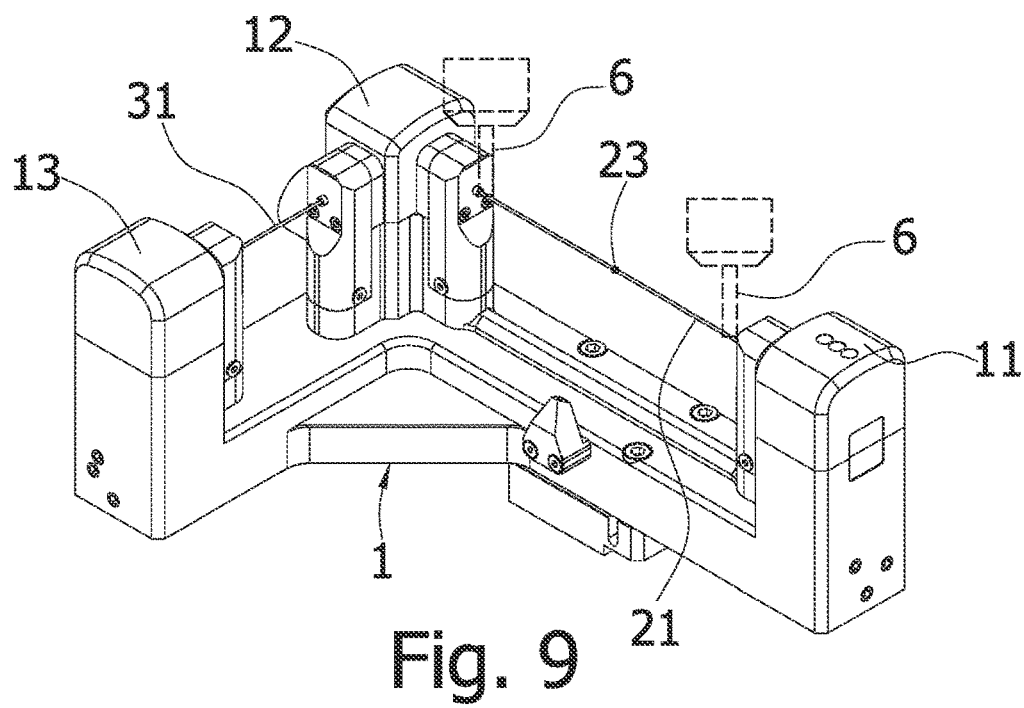
FIG. 9 and FIG. 10 are schematic drawings showing how a reference point of X-axis of a main light ray is defined of an embodiment according to the present invention.
Figure 10:
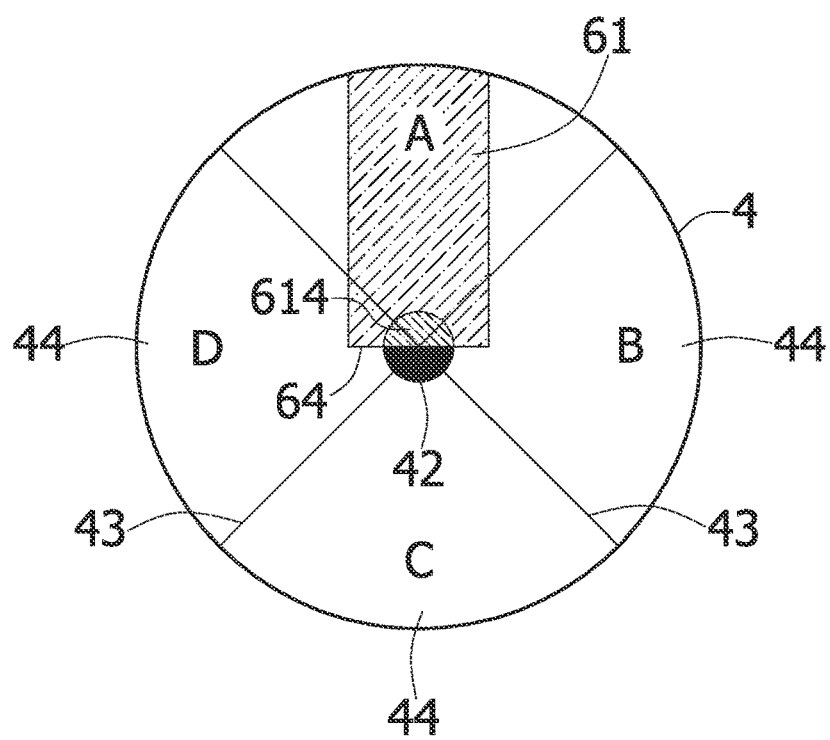

Step 11: define a reference point of X-axis of the main light ray 21. As shown in FIG. 9 and FIG. 10, the CNC machine tool 8 which is operated either by manual control or automatic control holds the standard bar 6 and moves a bottom edge of the standard bar 6 in longitudinal direction among the multidimensional directions relative to a center of span of the main light ray 21 by a progressive motion. Thus the light receiving area 42 of the quadrant detectors 4 is masked by the standard bar 6 and a trigger event occurs so that the light receiving area 42 is reduced and an upper-side shaded area 614 is formed. When a part of the upper-side shaded area 614 and a half of the light receiving area 42 are overlapped, a reference point of X axis (or X-axis center point) of the reference coordinate 23 is set and defined. The quadrant detectors 4 outputs a trigger voltage of the reference point of the X axis which is written into the automatic controller 5 and the control device 81 synchronously. A part of the upper-side shaded area 614 overlapped with a half of the light receiving area 42 is distributed on the respective quadrants including A, B, and D quadrants. The change in the light receiving area 42 of the photoelectric sensor 44 at the B quadrant is a half of the light receiving area 42 at the B quadrant and so is the light receiving area 42 of the photoelectric sensor 44 at the D quadrant while the light receiving area 42 of the photoelectric sensor 44 at the A quadrant has no change.

Step 12: define a reference point of Y-axis of the main light ray 21. Refer to FIG. 11, FIG. 12 and FIG. 13, the CNC machine tool 8 which is automatically controlled holds the standard bar 6 and moves the right edge and the left edge of the standard bar 6 in transverse direction among the multidimensional directions to a left-side position and a right-side position relative to the reference point of the X axis of the main light ray 21 by a progressive motion. Thus the light receiving area 42 of the quadrant detectors 4 is masked by the standard bar 6 and a trigger event occurs so that the light receiving area 42 is reduced and a left-side shaded area 612 as well as a right-side shaded area 613 is formed.

When a part of the left-side shaded area 612 and a part of the right-side shaded area 613 are overlapped with a half of the light receiving area 42, a reference point of Y axis (or Y-axis center point) of the reference coordinate 23 is defined and set. The quadrant detectors 4 outputs a trigger voltage of the reference point of the Y axis which is written into the automatic controller 5 and the control device 81 synchronously. As shown in FIG. 12, a part of the left-side shaded area 612 is overlapped with a half of the light receiving area 42 on the respective quadrants including A, C, and D quadrants. The change in the light receiving area 42 of the photoelectric sensor 44 at the A quadrant is a half of the original light receiving area 42 at the A quadrant and so is the light receiving area 42 of the photoelectric sensor 44 at the C quadrant while the light receiving area 42 of the photoelectric sensor 44 at the D quadrant has no change. As shown in FIG. 13, a part of the right-side shaded area 613 is overlapped with a half of the light receiving area 42 on the respective quadrants including A, B, and C quadrants. The change in the light receiving area 42 of the photoelectric sensor 44 at the A quadrant is a half of the light receiving area 42 at the A quadrant and so is the light receiving area 42 of the photoelectric sensor 44 at the C quadrant while the light receiving area 42 of the photoelectric sensor 44 at the B quadrant has no change.

Figure 14:
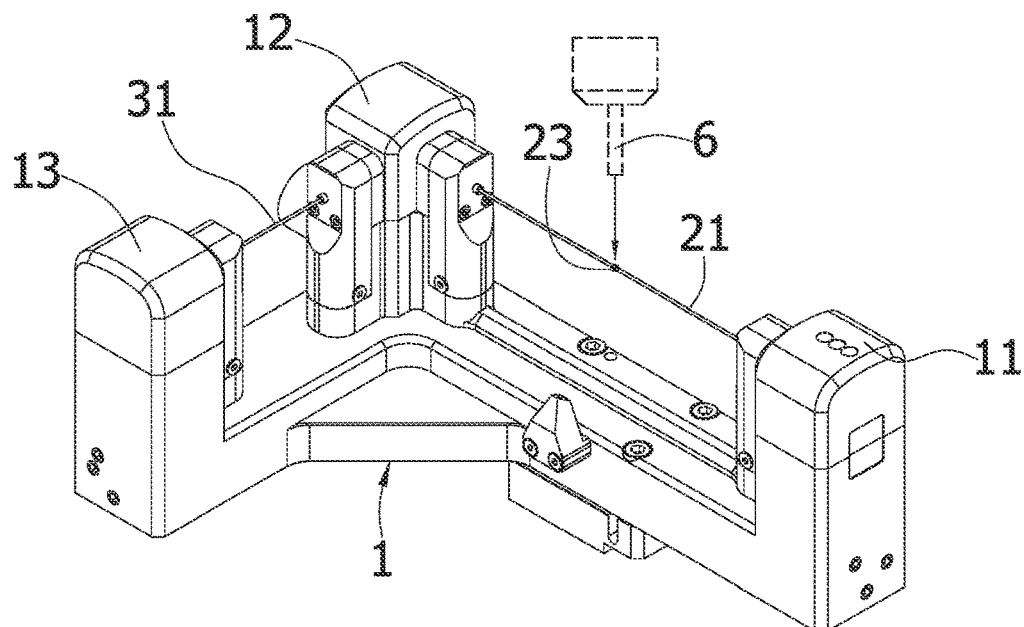
FIG. 14 and FIG. 15 are schematic drawings showing how a reference point of Z-axis of a main light ray is defined of an embodiment according to the present invention.
Figure 15:
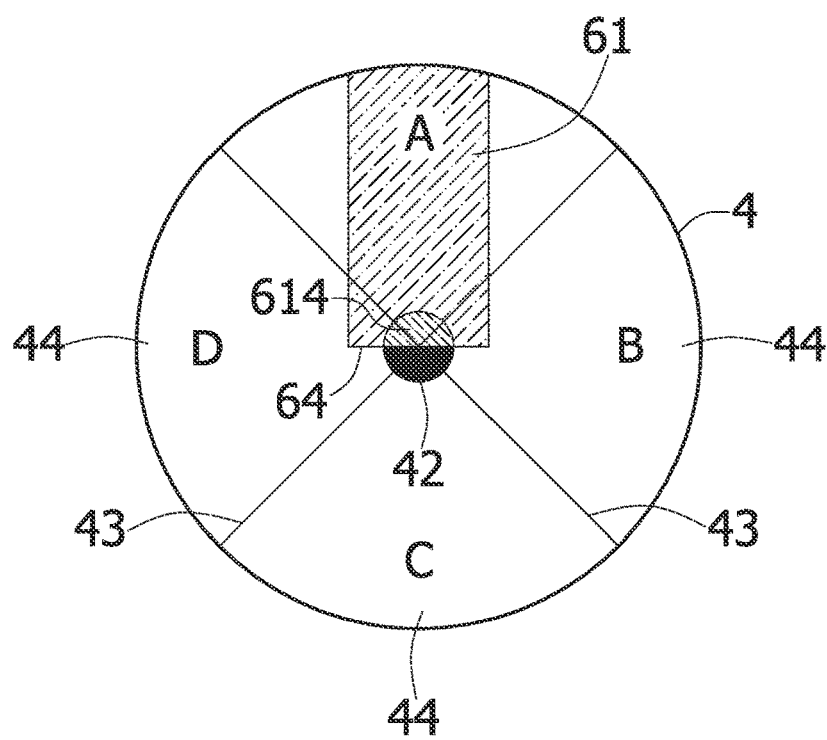

Step 13: define a reference point of Z-axis of the main light ray 21. As shown in FIG. 14 and FIG. 15, the CNC machine tool 8 which is automatically controlled holds the standard bar 6 and moves a bottom edge of the standard bar 6 in longitudinal direction among the multidimensional directions to an upper position relative to the reference point of the X axis of the main light ray 21 by a progressive motion. Then the standard bar 6 is further moved to the reference point of the X axis by vertical displacement. Thus the light receiving area 42 of the quadrant detectors 4 is masked by the standard bar 6 and a trigger event occurs so that the light receiving area 42 is reduced and an upper-side shaded area 614 is formed. When a part of the upper-side shaded area 614 and a half of the light receiving area 42 are overlapped, a reference point of Z axis (or Z-axis center point) of the reference coordinate 23 is defined and set. The quadrant detectors 4 outputs trigger voltage of the reference point of the Z axis which is written into the automatic controller 5 and the control device 81 synchronously.

Thereby the automatic controller 5 and the control device 81 complete the settings of the reference points of the X, Y and Z axes of the reference coordinate 23.

Figure 16:
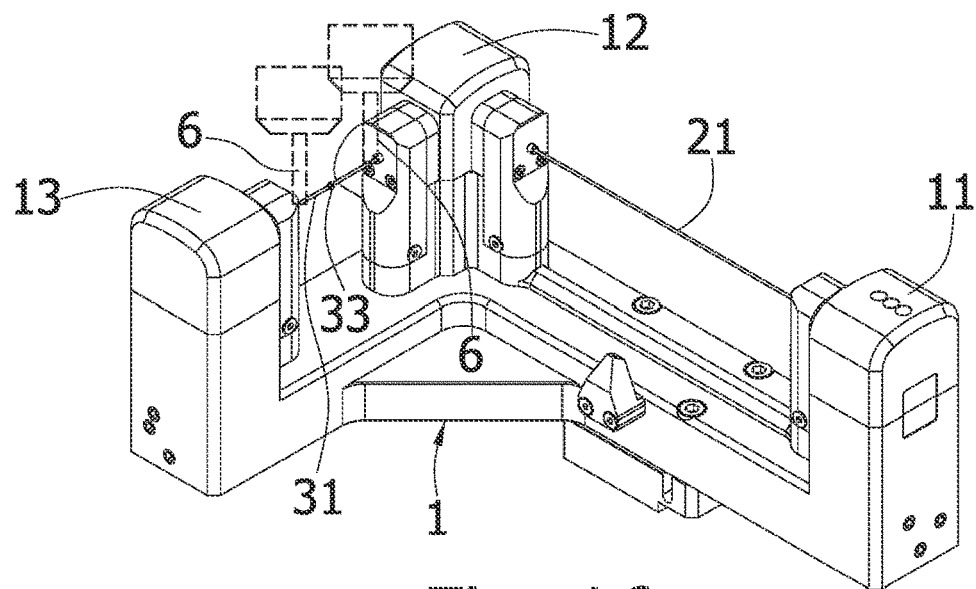
FIG. 16 and FIG. 17 are schematic drawings showing how a reference point of Y-axis of a reflected light ray is defined of an embodiment according to the present invention.
Figure 17:
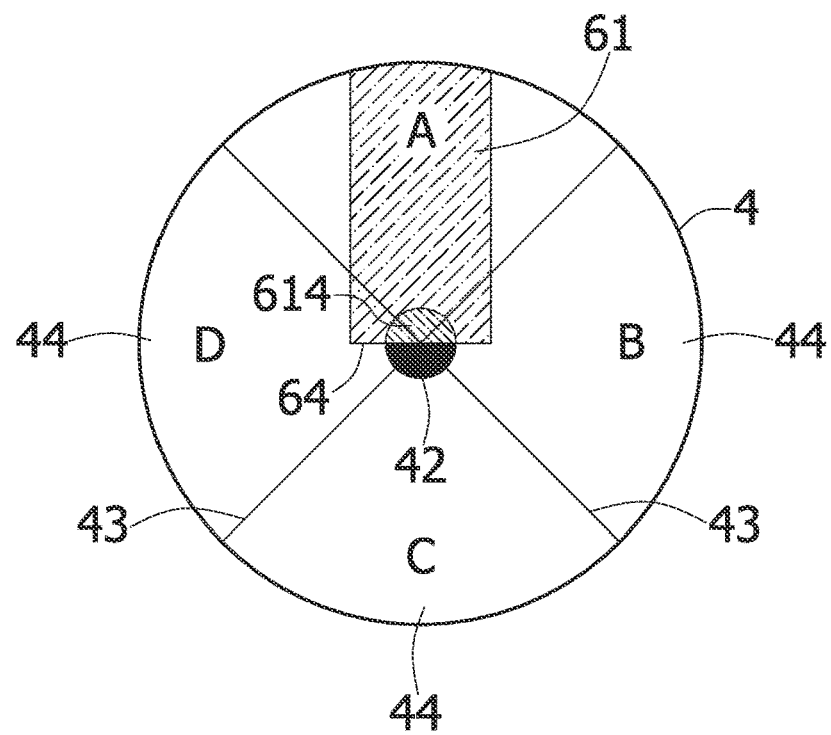

Step 14: define a reference point of Y-axis of the reflected light ray 31. The measurement process is the same as the step 11. As shown in FIG. 16 and FIG. 17, the CNC machine tool 8 which is operated either by manual control or automatic control holds the standard bar 6 and moves a bottom edge of the standard bar 6 in longitudinal direction among the multidimensional directions toward the reflected light ray 31 (or a center of span of the reflected light ray 31) in the complex vector space 32 by a progressive motion. Thus the light receiving area 42 of the quadrant detectors 4 is masked by the standard bar 6 and a trigger event occurs so that the light receiving area 42 is reduced and an upper-side shaded area 614 is formed. When a part of the upper-side shaded area 614 and a half of the light receiving area 42 are overlapped, a reference point of Y axis (or Y-axis center point) of the position coordinate 33 is defined and set. The quadrant detectors 4 outputs a trigger voltage of the reference point of the Y axis which is written into the automatic controller 5 and the control device 81 synchronously.

Step 15: define a reference point of X-axis of the reflected light ray 31. The measurement process is the same as the step 12. As shown in FIG. 18-20, the CNC machine tool 8 is automatically controlled to hold the standard bar 6 and move the right edge and the left edge of the standard bar 6 in transverse direction among the multidimensional directions to a left-side position and a right-side position relative to the reference point of the Y axis of the reflected light ray 31 by a progressive motion. Then the standard bar 6 is further moved to the reference point of the Y axis by horizontal displacement. Thus the light receiving area 42 of the quadrant detectors 4 is masked by the standard bar 6 and a trigger event occurs so that the light receiving area 42 is reduced and a left-side shaded area 612 as well as a right-side shaded area 613 is formed. When a part of the left-side shaded area 612 and a part of the right-side shaded area 613 are overlapped with a half of the light receiving area 42, a reference point of X axis (or X-axis center point) of the position coordinate 33 is defined and set. The quadrant detectors 4 outputs a trigger voltage of the reference point of the X axis which is written into the automatic controller 5 and the control device 81 synchronously.

Figure 21:
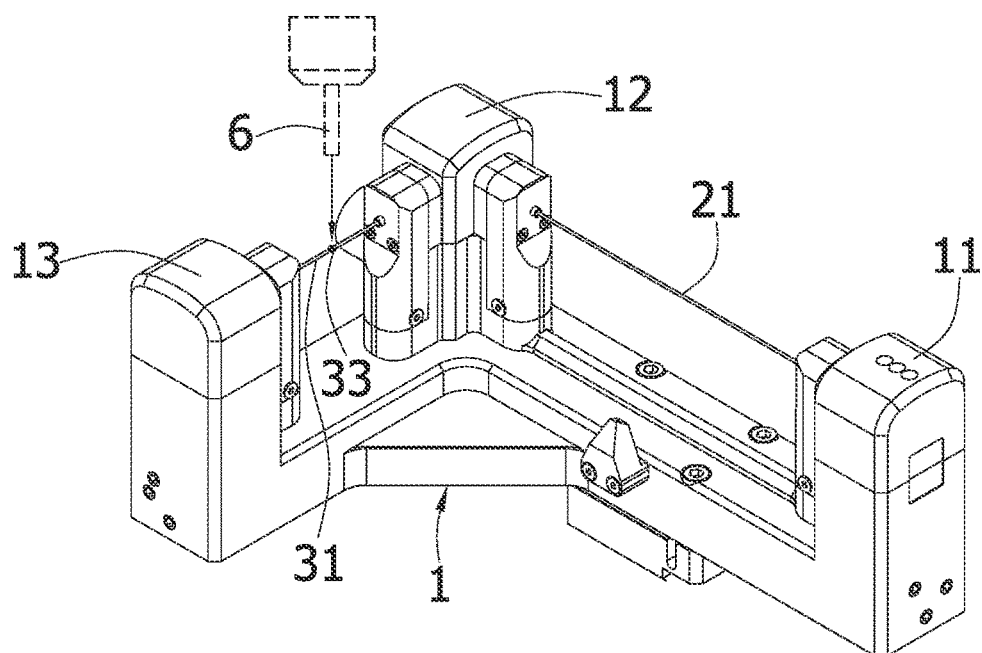
FIG. 21 and FIG. 22 are schematic drawings showing how a reference point of Z-axis of a reflected light ray is defined of an embodiment according to the present invention.
Figure 22:
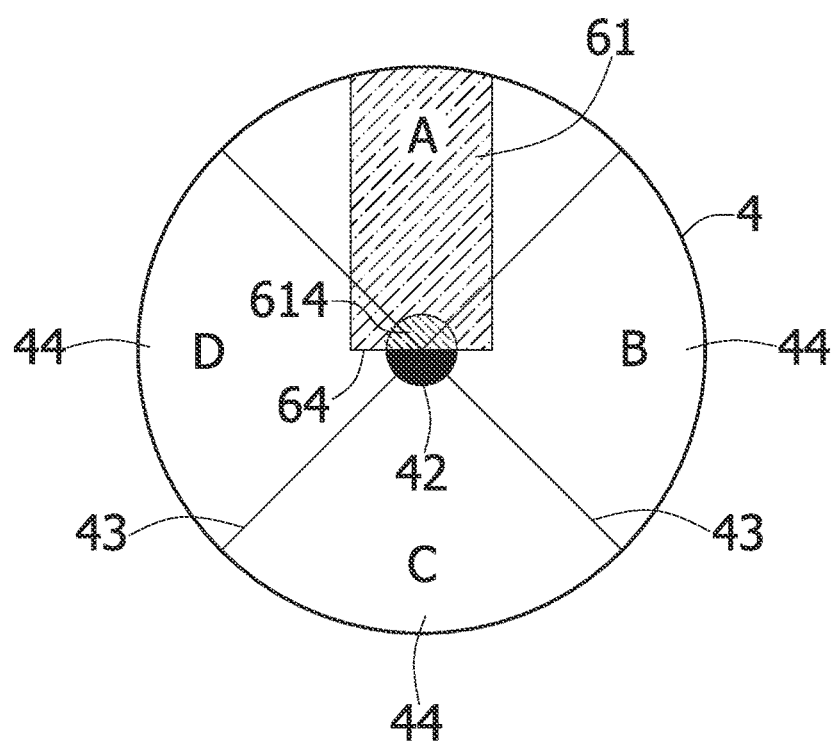

Step 16: define a reference point of Z-axis of the reflected light ray 31. The measurement process is similar to that of the step 13. Refer to FIG. 21 and FIG. 22, the CNC machine tool 8 which is automatically controlled to hold the standard bar 6 and move a bottom edge of the standard bar 6 in longitudinal direction among the multidimensional directions to an upper position relative to the reference point of the X axis by a progressive motion. Then the standard bar 6 is further moved to the reference point of the X axis of the reflected light ray 31 by vertical displacement. Thus the light receiving area 42 of the quadrant detectors 4 is masked by the standard bar 6 and a trigger event occurs so that the light receiving area 42 is reduced and an upper-side shaded area 614 is formed. When a part of the upper-side shaded area 614 and a half of the light receiving area 42 are overlapped, a reference point in Z axis (or Z-axis center point) of the position coordinate 33 is defined and set. The quadrant detectors 4 outputs trigger voltage of the reference point of the Z axis which is written into the automatic controller 5 and the control device 81 synchronously. Thereby the automatic controller 5 and the control device 81 complete the settings of the reference points of the X, Y and Z axes of the position coordinate 33.

Figure 23:
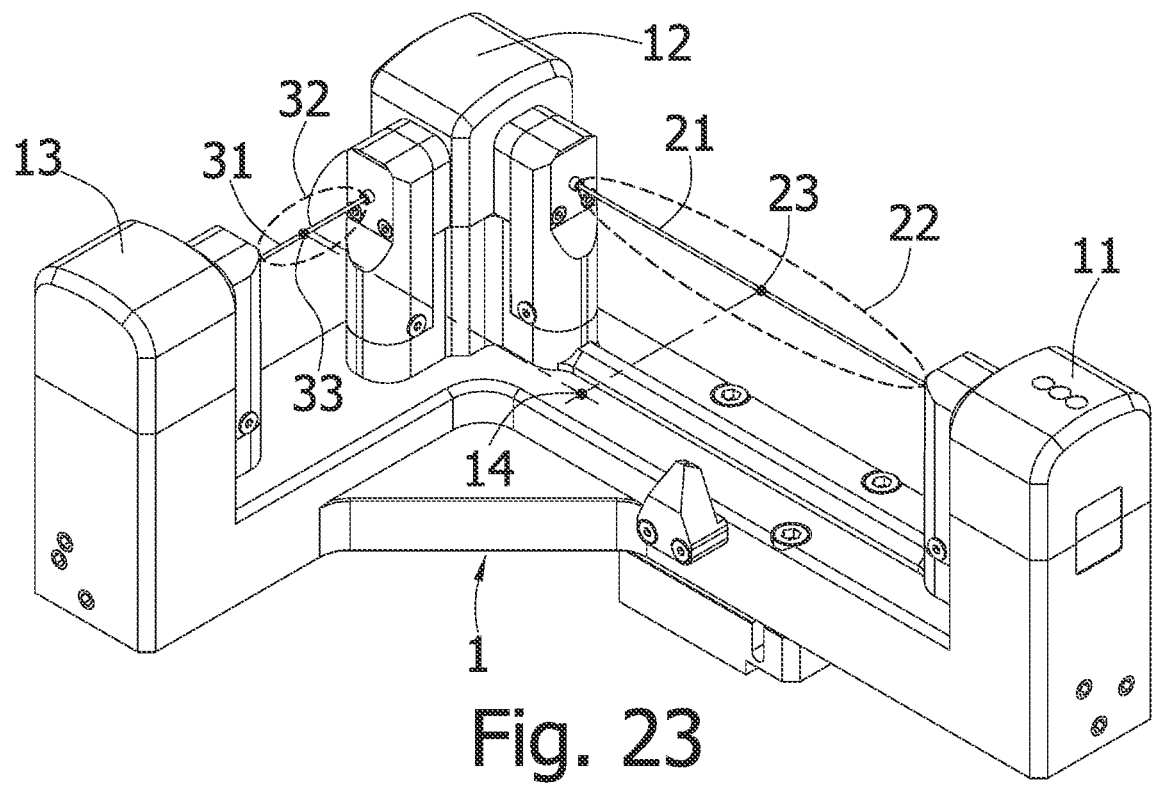
FIG. 23 and FIG. 24 are schematic drawings showing how a reference point or a crossing zero of a thermal variable is defined of an embodiment according to the present invention.
Figure 24:
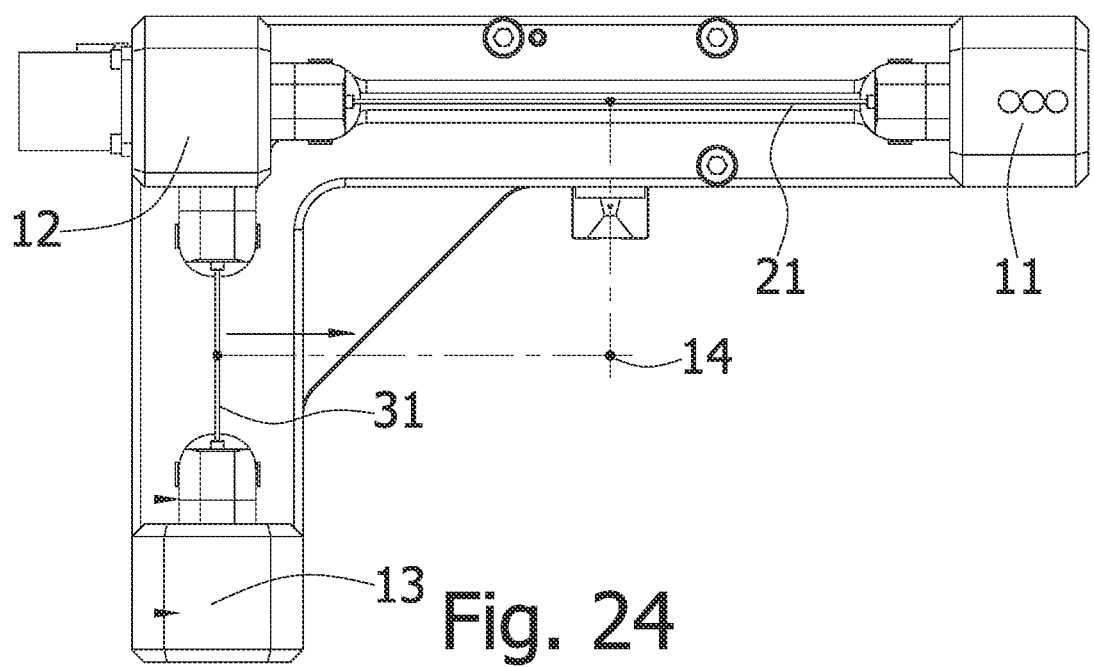
Figure 25:
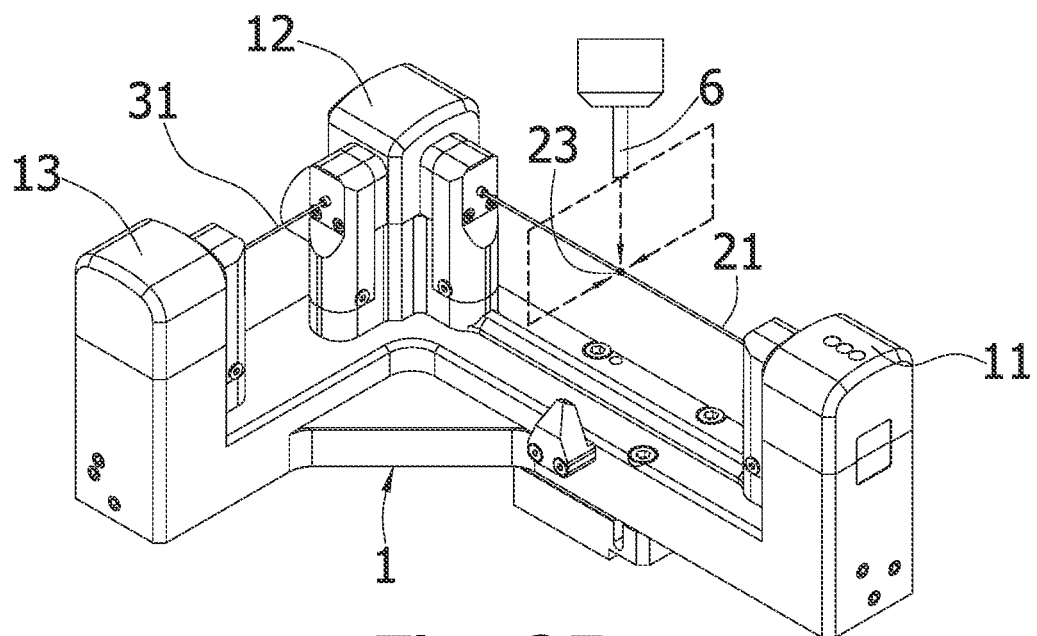
FIG. 25 is a schematic drawing showing set-up of a standard value set of a standard bar of an embodiment according to the present invention.
Figure 26:
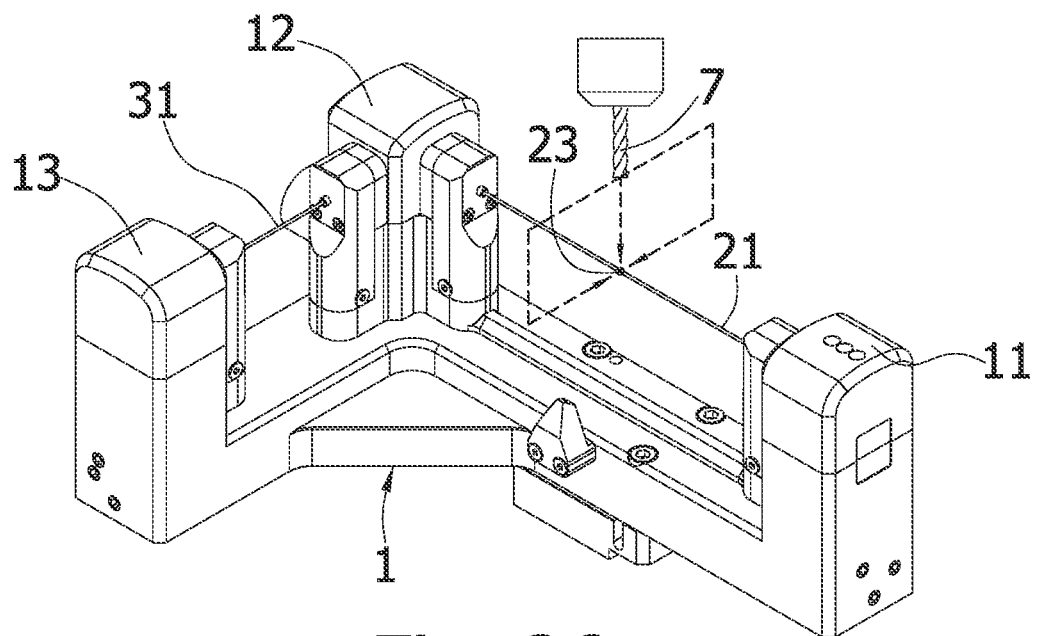
FIG. 26 is a schematic drawing showing set-up of a standard value set of an unfinished tool of an embodiment according to the present invention.

Step 17: define a reference point (or the crossing zero) of the thermal variable. As shown in FIG. 23 and FIG. 24, the automatic controller 5 is orthogonal to both the reference coordinate 23 of the main light ray 21 and the position coordinate 33 of the reflected light ray 31 respectively by a vertical line. By the vertical lines, the automatic controller 5 converts orthogonal projection of the reference coordinate 23 and the position coordinate 33 on the hypotenuse of the right-angle triangular base 1 into the spatial coordinate 14 which is the crossing zero and used as a reference point for measurement of thermal variables of the CNC machine tool 8.

After using the standard bar 6 to get the reference coordinate 23 in the measurement space 22 and then the position coordinate 33 in the complex vector space 32, run the following steps.

Figure 5:
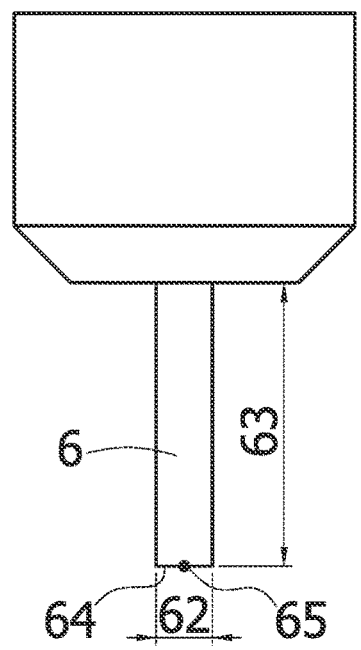
FIG. 5 is a schematic drawing of a standard bar of an embodiment according to the present invention.

Step 21: set up a standard value set of the standard bar 6. As shown in FIG. 25 and FIG. 27-29, the automatic controller 5 firstly sets up a standard radius vector 63 and the center point 65 of the standard bar 6 and then drives the center point 65 of the standard bar 6 to move to an upper position relative to the reference coordinate 23 (or the position coordinate 33) of the right-angle triangular base 1 by a progressive motion for performing vertical displacement triggering and circular motion triggering. Then a standard axial vector 62 (section width of X axis and Y axis) and a standard radius vector 63 (section height in Z axis) (as shown in FIG. 5) are generated by the left side, the right side, and the bottom side of the shaded area 61 triggering the coordinate origin 41. Next the standard axial vector 62 and the standard radius vector 63 relative to the reference coordinate 23 (or the position coordinate 33) are input into the automatic controller 5 for providing a calibration curve. The standard axial vector 62, the standard radius vector 63, and the calibration curve are all stored in the conserved common variable module 51 and used as a standard value set for subsequent measurements and comparisons.

Figure 6:
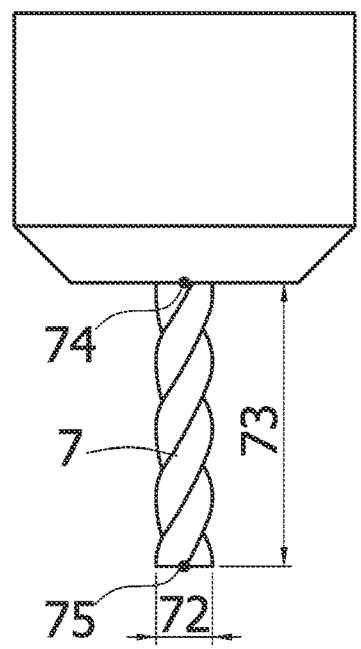
FIG. 6 is a schematic drawing of an unfinished tool of an embodiment according to the present invention.
Figure 7:
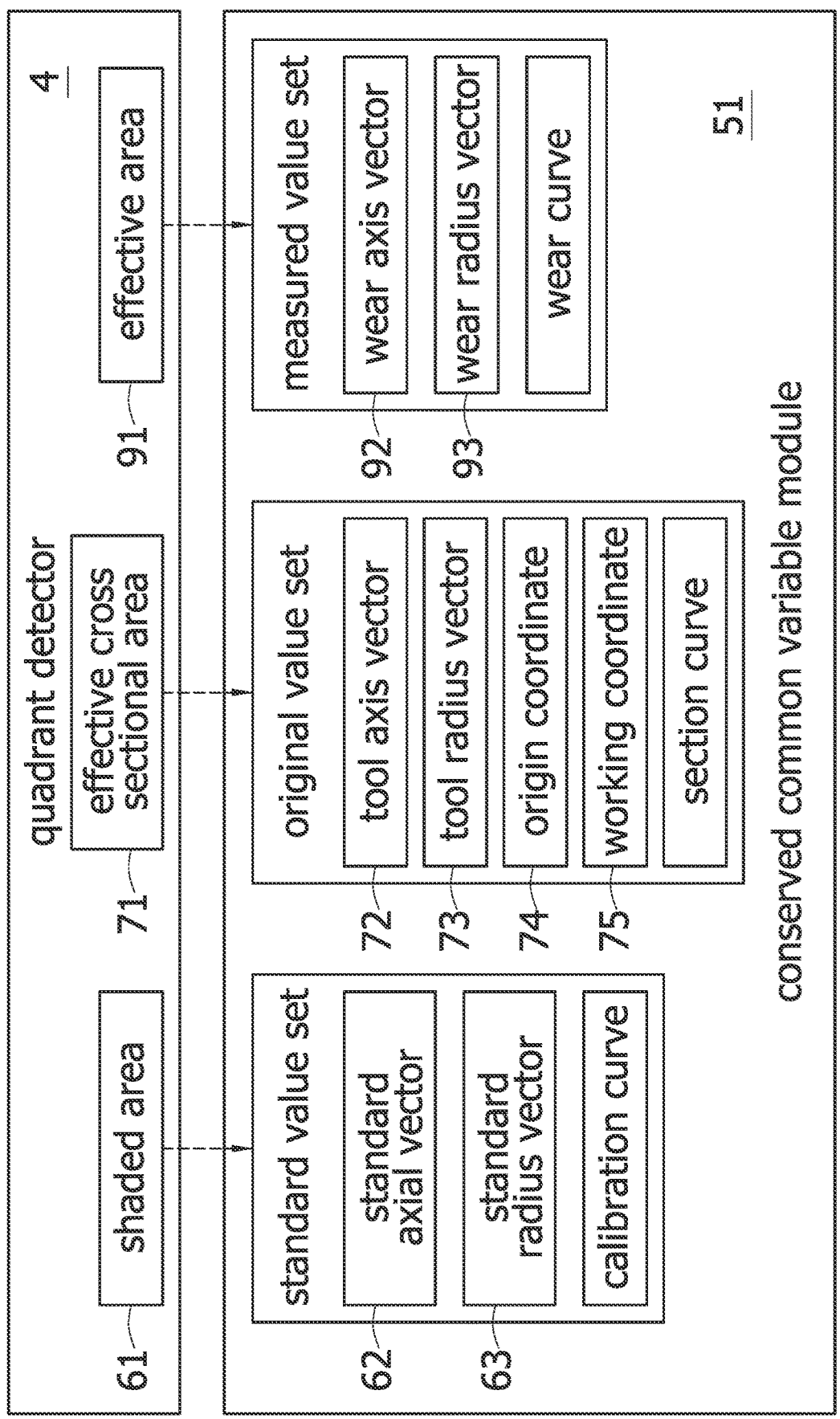
FIG. 7 is a flow chart showing transmission of optical signals between a conserved common variable module and a quadrant detector of an embodiment according to the present invention.
Figure 30:
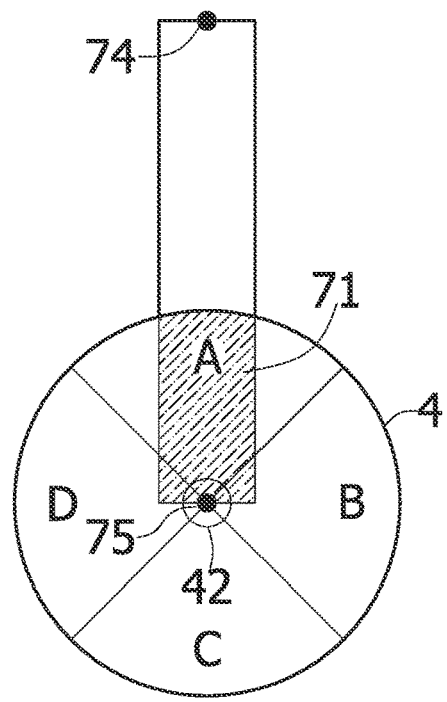
FIG. 30 is a schematic drawing showing vertical displacement triggering of an unfinished tool for setting an origin coordinate, a working coordinate, and a tool radius vector of an embodiment according to the present invention.
Figure 31:
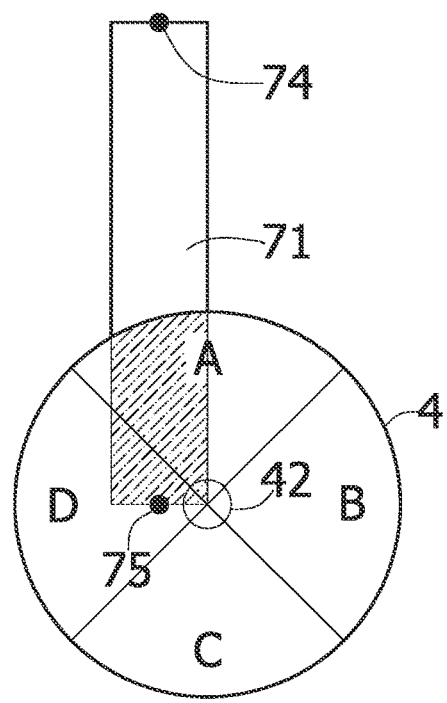
FIG. 31 and FIG. 32 are schematic drawings showing circular motion triggering of an unfinished tool for setting a tool axis vector of an embodiment according to the present invention.
Figure 32:
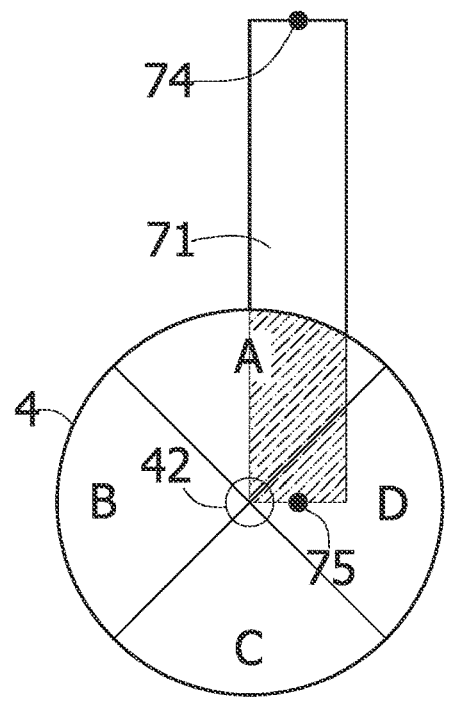
Figure 33:
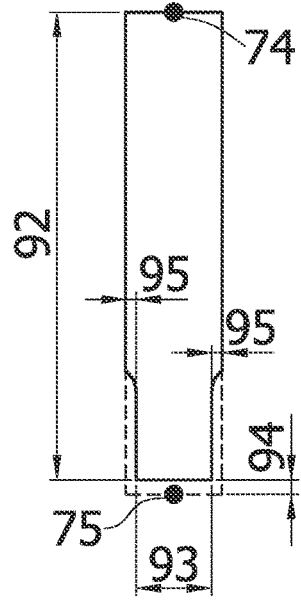
FIG. 33-36 are schematic drawings showing set-up of a measured value set of a processed tool of an embodiment according to the present invention.
Figure 34:
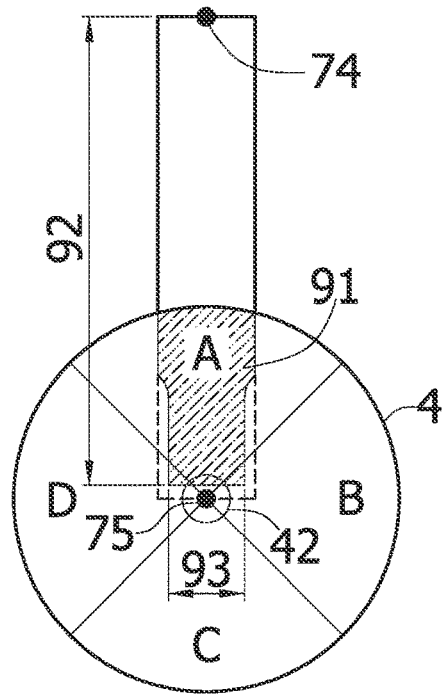
Figure 35:
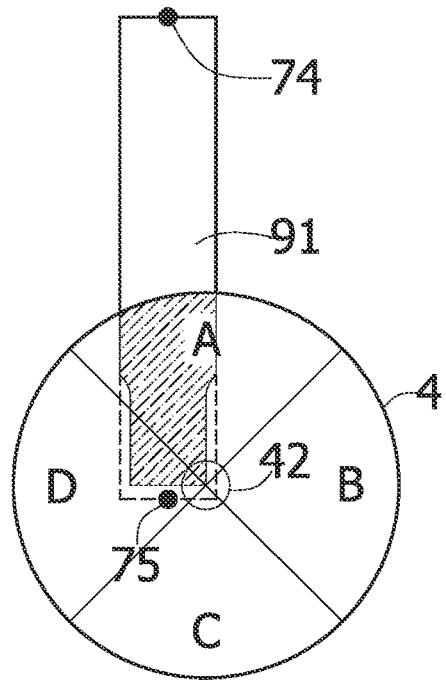
Figure 36:
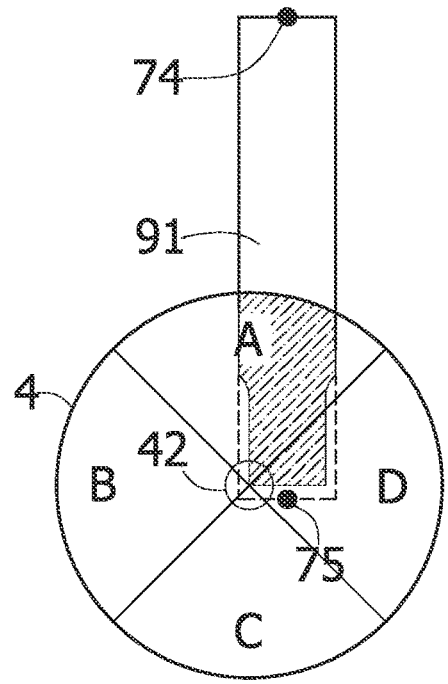

Step 22: set up an original value set of the unfinished tool 7. As shown in FIG. 26 and FIG. 30-32, the automatic controller 5 firstly sets up an origin coordinate 74 and a working coordinate 75 of the unfinished tool 7 and then drives the working coordinate 75 of the unfinished tool 7 to move to an upper position relative to the reference coordinate 23 (or the position coordinate 33) of the right-angle triangular base 1 by a progressive motion for vertical displacement triggering (as shown in FIG. 30) and circular motion triggering (as shown in FIG. 31 and FIG. 32). Then a tool axis vector 72 (section width of X axis and Y axis) and a tool radius vector 73 (section height in Z axis) (as shown in FIG. 6) are created by the left side, the right side, and the bottom side of the effective cross sectional area 71 triggering the coordinate origin 41. Next the tool axis vector 72 and the tool radius vector 73 relative to the reference coordinate 23 (or the position coordinate 33) are input into the automatic controller 5 for providing a section curve. The tool axis vector 72, the tool radius vector 73, the origin coordinate 74, the working coordinate 75, and the section curve are all stored in the conserved common variable module 51 and used as an original value set for subsequent measurements and comparisons. The automatic controller 5 performs an error analysis on the standard value set and the original value set for obtaining a relative difference. Since the standard axial vector 62 and the standard radius vector 63 of the standard bar 6 are known fixed values, a tool length and a tool radius of the unfinished tool 7 are calculated according to the relative difference obtained after the tool axis vector 72 and the tool radius vector 73 being compared with the standard axial vector 62 and the standard radius vector 63. The tool length and the tool radius are updated in the conserved common variable module 51.

Step 23: set up a measured value set of the processed tool 9. As shown FIG. 33-36, tool wear or tool failure occurs after the unfinished tool 7 being processed for a period of time and become the processed tool 9. During the processing, the control device 81 regularly drives the processed tool 9 at a working coordinate 75 to align with the reference coordinate 23 and/or the position coordinate 33 and thus form an effective area 91 on the quadrant detector 4. After the effective area 91 being input into the automatic controller 5, a wear axis vector 92 and/or a wear radius vector 93 are measured for establishing a wear curve. Then the wear axis vector 92, the wear radius vector 93, and the wear curve are all stored in the conserved common variable module 51 and used as a measured value set. Then the automatic controller 5 performs an error analysis on the original value set and the measured value set to get an aspect ratio and/or an offset ratio and further obtain a difference of a tool length and/or a tool radius of the processed tool 9. The difference includes an axial difference 94 and/or a radial difference 95. The difference is sent to the control device 81 by the correcting unit 52 to reset the working coordinate 75 of the processed tool 9 for performing tool length compensation and/or a tool radius compensation or offset error compensation. An allowable value of the processed tool 9, such as tolerance of percentage of area reduction of a broken tool, a tool wear tolerance, and a tolerance level of radial deflection, yawing, negatively skewed, deviation of the vertical, radial deviation, and transient deviation of a deflected tool, can be set according to user's needs. Once the correcting unit 52 detects that the axial difference 94 or the radial difference 95 is over the allowable value set by the user, the automatic controller 5 shows alarm messages to remind the users that the processed tool 9 is already broken or deflected too much so that the users will not process the processed tool 9 due to poor processing precision resulted.

The present detector features on that tri-axial measurement procedure of thermal variables (thermal deformation, heat fluctuation, etc.) of the CNC machine tool 8 can be carried out simultaneously. During the measurement, at least one tool detector is disposed on one of the quadrants of the table. Or the tool detectors are arranged at two of the quadrants diagonal to each other, not adjacent to each other. The present tool detector is designed to have two kinds of functions including direct measurement type and trigger type.

Figure 37:
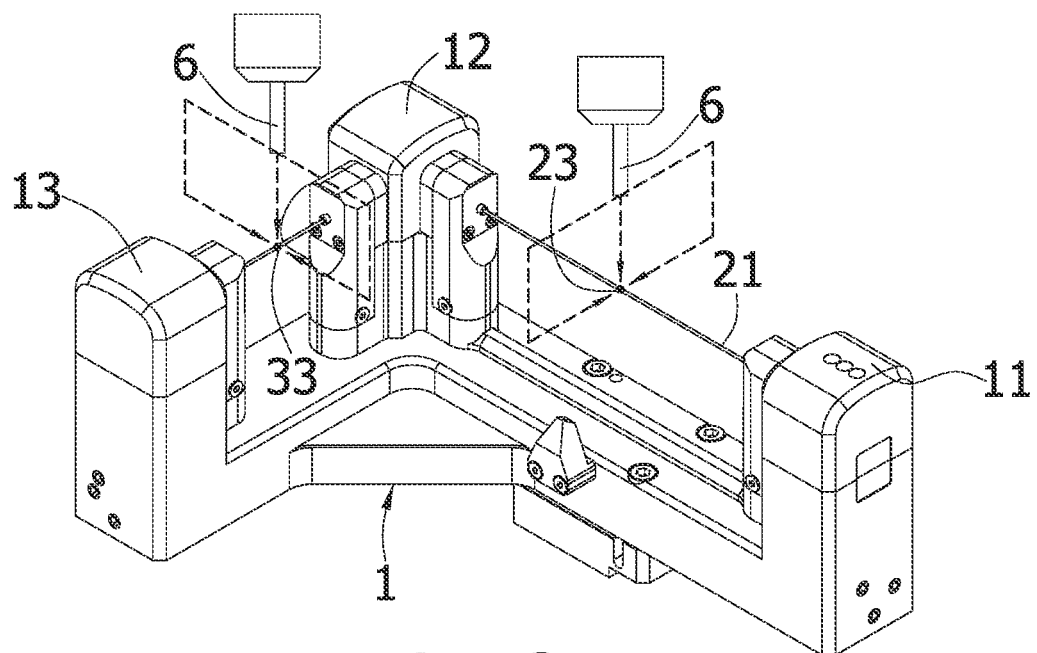
FIG. 37 is a schematic drawing showing a direct measurement function for measurement of thermal variables of an embodiment according to the present invention.

Step 31: direct measurement type function for measurement of thermal variables. After the automatic controller 5 activating a developed measuring program for direct-type measurement, the CNC machine tool 8 automatically changes the tool to the standard bar 6 used for measurement of thermal variables and activates a measurement mode. As shown in FIG. 37, the CNC machine tool 8 moves the standard 6 so that the reference line 64 is in circular motion to trigger the reference coordinate 23 of the main light ray 21 and the position coordinate 33 of the reflected light ray 31 in turn. The standard bar 6 masks the light receiving area 42 of the quadrant detector 4 and the reference line 64 is moved until it is overlapped with the coordinate origin 41. Then the automatic controller 5 records original values Dx1 and Dy1 of the spatial coordinate 14 obtained by orthogonal projection of the reference coordinate 23 and the position coordinate 33 in turn. Then the CNC machine tool 8 is moved upward to the highest position of the rotating shaft and starting rotation and warm-up. After rotating for a first period of time (such as 5 min), the CNC machine tool 8 activates the measurement mode to run the measurement procedure again. The CNC machine tool 8 moves the standard 6 to the reference coordinate 23 and the position coordinate 33 for measurement of a thermal variable after thermal deformation or heat fluctuation. After the warm-up, the automatic controller 5 records the first displacement values Dx2 and Dy2 of the spatial coordinate 14 in turn. A difference between Dx1 and Dx2 is the thermal variable of X axis after warming up for the first period of time (such as 5 min) while a difference between Dy1 and Dy2 is the thermal variable of Y axis after warming up for the first period of time (such as 5 min). After a second period of time (such as 10 min), repeat the warm-up and the measurement procedure mentioned above and the automatic controller 5 records the second displacement values Dx3 and Dy3 of the spatial coordinate 14 respectively again. a difference between Dx1 and Dx3 is the thermal variable of X axis after warming up for the second period of time (such as 10 min) while a difference between Dy1 and Dy3 is the thermal variable of Y axis after warming up for the second period of time (such as 10 min). Next the CNC machine tool 8 continues to measure in the same way to get the thermal variables. The automatic controller 5 records the measured value set of the tri-axial thermal variables to get a number of N+1 spatial coordinates 14, a number of N+2 spatial coordinates 14, and a number of N+3 spatial coordinates 14 respectively, all output to the control device 81 by a connecting line or a network. A corresponding software of the present invention used for recording the values of the thermal variable can also be developed and provided to the CNC machine tool manufacturers.

Figure 38:
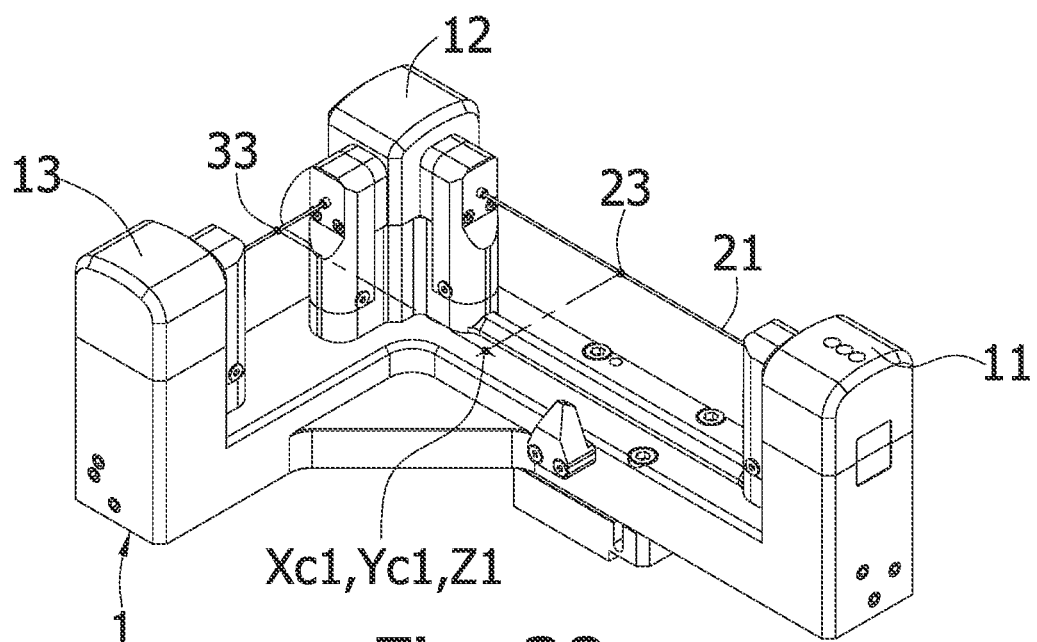
FIG. 38 is a schematic drawing showing a trigger-type function for measurement of thermal variables of an embodiment according to the present invention.

Step 32: trigger-type function for measurement of thermal variables. As shown in FIG. 38, after the automatic controller 5 activating a developed measuring program for trigger-type measurement, the CNC machine tool 8 automatically changes the tool to the standard bar 6 used for measurement of thermal variables and activates a measurement mode. Then the CNC machine tool 8 moves the reference line 64 of the standard 6 to the reference coordinate 23 of the main light ray 21 and the position coordinate 33 of the reflected light ray 31 in turn. The standard bar 6 masks the light receiving area 42 of the quadrant detector 4 and the reference line 64 is moved until it is overlapped with the coordinate origin 41. First the automatic controller 5 records a Z-axis coordinate Z1 of the CNC machine tool 8 by triggering on Z-axis of the main light ray 21. Then the automatic controller 5 calculates to get a Y-axis coordinate Yc according to two triggering positions obtained by triggering on the left side and the right side of main light ray 21 respectively. The tool detector provides a similar mode for measurement of the reflected light ray 31. After triggering on Z-axis of the reflected light ray 31, the automatic controller 5 calculates to get an X-axis coordinate Xc according to two triggering positions obtained by triggering on the left and the right sides of the reflected light ray 31. Now an original spatial coordinate 14 (Xc1, Yc1, Z1) is obtained. The CNC machine tool 8 is moved to the highest position of the rotating shaft and starting rotation and warm-up. After rotating for a first period of time (such as 5 min), the CNC machine tool 8 activates the measurement mode and repeat the above measurement procedure. The automatic controller 5 calculates to get the first spatial coordinate 14 (Xc2, Yc2, Z2). A difference between Xc1 and Xc2, a difference between Yc1 and Yc2, and a difference between Z1 and Z2 are the thermal variables of the X-axis, the Y-axis, the Z-axis respectively after warming up for the first period of time (5 min). Perform the measurement again after a second period of time (such as 10 min) and the automatic controller 5 calculates to get the second spatial coordinate 14 (Xc3, Yc3, Z3). A difference between Xc2 and Xc3, a difference between Yc2 and Yc3, and a difference between Z2 and Z3 are the thermal variables of the X-axis, the Y-axis, the Z-axis respectively after warming up for the second period of time (10 min). The subsequent thermal variables of the CNC machine tool 8 are measured in the same way and the CNC machine tool 8 can measure the thermal variable during the measurement of the standard bar 6. The spatial coordinates 14 are output from the automatic controller 5 to the control device 81 through the connecting line or the network so that the control device 81 can compensate an error of the thermal variable of the CNC machine tool 8 at the moment in a real-time manner.

The present invention can be applied to measure an angle of inclination of a column and the rotating shaft of the CNC machine tool 8. During the measurement, at least one tool detector is disposed on one of the quadrants of the table. Or two tool detectors are arranged at two of the quadrants diagonal to each other, not adjacent to each other. Or each of the quadrants is provided with a tool detector. The measuring program of the present tool detector provides the following functions.

Figure 39:
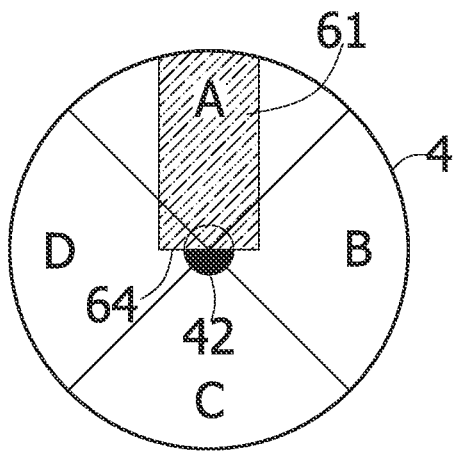
FIG. 39-41 are schematic drawings showing quadrant detectors after direct measurement of an angle of inclination of a column and a rotating shaft of an embodiment according to the present invention.
Figure 40:
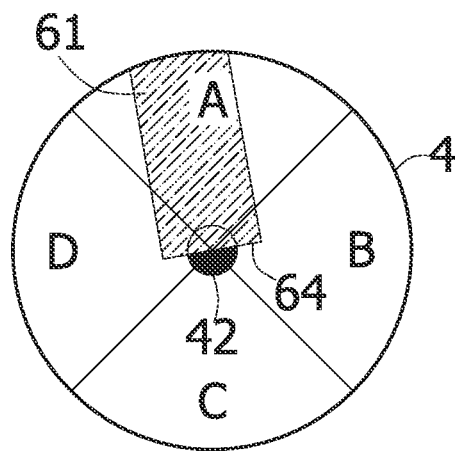
Figure 41:
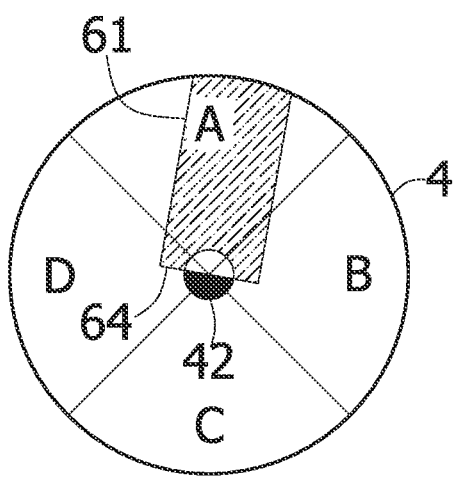

Step 41: direct measurement of angle of inclination of a column and a rotating shaft. After the automatic controller 5 activating a measurement mode, the CNC machine tool 8 automatically changes the tool to the standard bar 6. Then the CNC machine tool 8 moves the standard 6 with the reference line 64 to the reference coordinate 23 of the main light ray 21 and the position coordinate 33 of the reflected light ray 31 in turn. The standard bar 6 masks the light receiving area 42 of the quadrant detector 4 and the reference line 64 is moved until it is overlapped with the coordinate origin 41. The automatic controller 5 gets and processes optical signals at a plurality of places with known angle between the photoelectric sensor 44 of the quadrant sensor 4 to obtain the wear curve. Then the correcting unit 52 uses the calibration curve and a nonlinear regression algorithm to calculate the angle of inclination of the standard bar 6 at the reference coordinate 23 and the position coordinate 33 as well as the wear curve formed on the quadrant detector 4 and further get an angle of the wear curve. As shown in FIG. 39, while a head of the rotating shaft has no error in the angle of inclination, the automatic controller 5 calculates VB−VD=0 in FIG. 39 and outputs VB−VD=0 through a network connector. When there is an error in the angle of inclination, the automatic controller 5 outputs a result of a wear curve (VB−VD) in FIG. 40 or a wear curve (VD−VA) in FIG. 41 and then performs numerical calculation based on the calibration curve and the wear curves to get a relative difference which causes changes in voltage of the respective photoelectric sensors 44 at quadrants A, B, D. During the calculation process, a change in voltage of the photoelectric sensor 44 measured at quadrant C means that cutting fluid is detected.

Step 42: trigger-type measurement of angle of inclination of a column and rotating shaft. The trigger-type measurement is applied to large-scale 5-axis gantry-type CNC machine tool. After the automatic controller 5 activating a measurement mode, the 5-axis gantry-type CNC machine tool automatically changes the tool to the standard bar 6. Then the 5-axis gantry-type CNC machine tool moves the standard 6 with the reference line 64 to the reference coordinate 23 of the main light ray 21 and the position coordinate 33 of the reflected light ray 31 in turn. The standard bar 6 masks the light receiving area 42 of the quadrant detector 4 and the reference line 64 is moved until it is overlapped with the coordinate origin 41. In the reference coordinate 23 of the main light ray 21, A-axis of the 5-axis gantry-type CNC machine tool is tilt or rotating around a tool center point (TCP) to carry out a position analysis. When the automatic controller 5 obtains the optical signals and calculates that the angle of inclination of the position is zero, the movement stops and the position at the moment is recorded. According to the position at the moment and the position of the reference coordinate 23, an angle of inclination of Y-axis can be calculated. Similarly, the standard bar 6 is moved to the position coordinate 33 of the reflected light ray 31 and the A-axis slowly swings and stops when the automatic controller 5 calculates that the angle of inclination of the position is zero. The automatic controller 5 records the position at the moment and calculates an angle of inclination of X-axis based on the position at the moment and the position of the position coordinate 33. The calculation method is the same as the step 41.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A tool detector which is disposed on a table of a computer numerical control (CNC) machine provided with at least one rotating shaft, three linear axes, and a control device, the tool detector comprising:

a right-angle triangular base which is provided with a first angular position, a second angular position, and a third angular position;

a main light ray emitted from a light source disposed on the first angular position to a plane mirror arranged at the second angular position so that a reflected light ray is generated due to the plane mirror and incident into a coordinate origin at a center of symmetry of a quadrant detector located at the third angular position to generate a light receiving area, wherein the quadrant detector is disposed by a diagonal method in which a coordinate axis of the quadrant detector is rotated with respect to a coordinate origin through an angle of inclination and arranged at the third angular position; and an automatic controller in communication with the control device, the automatic controller comprising a correcting unit and a conserved common variable module, wherein a standard value set, an original value set, and a measured value set are stored in the conserved common variable module;

wherein the control device drives a standard bar to move and form a shaded area on the quadrant detector; then a reference coordinate is defined by projection of the shaded area in multi-dimensional directions in a measurement space of the main light ray while a position coordinate is defined by projection of the shaded area in multi-dimensional directions in a complex vector space of the reflected light ray wherein the shaded area, an effective cross sectional area, and an effective area in the reference coordinate or the position coordinate respectively are used to perform an error analysis on the original value set and the measured value set to get a difference of an unfinished tool, wherein the difference is transmitted to the control device by the correcting unit to reset a compensation of the unfinished tool;

wherein orthogonal projection of the reference coordinate and the position coordinate on a hypotenuse of the right-angle triangular base is also converted into a spatial coordinate which is a crossing zero and then the control device drives the standard bar to the reference coordinate and the position coordinate repeatedly at a time interval to get spatial coordinates which are used for measurement of a thermal variable of the CNC machine.

2. The tool detector as claimed in claim 1, wherein a center point of a reference line of the standard bar is aligned with the reference coordinate or the position coordinate and then a standard axial vector and a standard radius vector are set up by the shaded area; the standard axial vector and the standard radius vector are input into the automatic controller to set up the standard value set; later the control device drives an unfinished tool at a working coordinate to align with the reference coordinate or the position coordinate for performing measurements; the effective cross sectional area in the reference coordinate and the position coordinate respectively is used to set up a tool axis vector, a tool radius vector, and an origin coordinate which are all input into the automatic controller to set up the original value set; the automatic controller performs an error analysis on the standard value set and the original value set to get a difference by which a tool length and a tool radius of the unfinished tool are further obtained; tool wear or tool failure occurs after the unfinished tool being processed for a period of time and the unfinished tool becomes a processed tool; the control device drives the processed tool at a working coordinate to align with the reference coordinate or the position coordinate and thus form the effective area on the quadrant detector; after the effective area being input into the automatic controller, a wear axis vector or a wear radius vector is measured respectively for set-up of the measured value set; the automatic controller performs an error analysis on the original value set and the measured value set to get a difference of a tool length or a tool radius of the processed tool; the difference is transmitted to the control device by the correcting unit to reset the working coordinate, a tool radius compensation, or an offset error compensation of the processed tool for measurement and compensation of the tool length or the tool radius of the processed tool.

3. The tool detector as claimed in claim 1, wherein the coordinate axis of the quadrant detector is rotated with respect to the coordinate origin through the angle of inclination to keep the reflected light ray vertically emitted to the quadrant detector; thus the quadrant detector with at least one angle bisector receives optical signals of the reflected light ray and generate the light receiving area on the coordinate origin; the quadrant detector is formed by two photoelectric sensors each of which having the same area and photoelectric properties; the angle bisector is formed between the two photoelectric sensors and inclined at an angle with respect to a horizontal plane.

4. The tool detector as claimed in claim 1, wherein the coordinate axis of the quadrant detector is rotated with respect to the coordinate origin through the angle of inclination to keep the reflected light ray vertically emitted to the quadrant detector; thus the quadrant detector with at least one angle bisector receives optical signals of the reflected light ray and generate the light receiving area on the coordinate origin; the quadrant detector is formed by four photoelectric sensors each of which having the same area and photoelectric properties; the angle bisector is formed between two of the photoelectric sensors adjacent to each other and the respective angle bisectors are inclined at an angle with respect to a horizontal plane.

* * * * *